United States Patent
Varghese

(10) Patent No.: US 12,541,741 B2
(45) Date of Patent: Feb. 3, 2026

(54) STORAGE AND CONSUMPTION OF SOFTWARE BILL OF MATERIALS ON PUBLIC BLOCKCHAIN

(71) Applicant: MICROSOFT TECHNOLOGY LICENSING, LLC, Redmond, WA (US)

(72) Inventor: Nelson Paily Varghese, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 18/126,037

(22) Filed: Mar. 24, 2023

(65) Prior Publication Data

US 2024/0320624 A1    Sep. 26, 2024

(51) Int. Cl.
G06Q 10/0875    (2023.01)
G06Q 20/38    (2012.01)

(52) U.S. Cl.
CPC ..... *G06Q 10/0875* (2013.01); *G06Q 20/3827* (2013.01); *G06Q 20/389* (2013.01)

(58) Field of Classification Search
None
See application file for complete search history.

(56) References Cited

U.S. PATENT DOCUMENTS 11,150,888 B2 * 10/2021 Beard ................. H04L 9/50
11,809,575 B1 * 11/2023 Reddy ................. G06F 21/577
2018/0287800 A1 * 10/2018 Chapman ............ H04L 9/3226
2019/0303541 A1   10/2019 Reddy et al.
2020/0201620 A1    6/2020 Beard
2020/0327137 A1   10/2020 Farver et al.
2021/0097528 A1 *  4/2021 Wang ................ H04L 9/30
2021/0311926 A1   10/2021 Ponceleon et al.
2022/0166626 A1    5/2022 Madisetti et al.
2023/0072264 A1 *  3/2023 Coccia ............... G06F 21/44
2023/0073608 A1 *  3/2023 Awasthy ............. G06Q 40/03
2024/0086549 A1 *  3/2024 Rapowitz ........... G06F 21/6245

(Continued)

OTHER PUBLICATIONS

Iain Barclay et. al., "Towards Traceability in Data Ecosystems using a Bill of Materials Model", Jun. 12, 2019 (Year: 2019).*

(Continued)

*Primary Examiner* — Patrick McAtee
*Assistant Examiner* — Timothy Paul Sax
(74) *Attorney, Agent, or Firm* — David Foster; Newport IP, LLC

(57) ABSTRACT

Disclosed is a secure and distributed system for storing and consuming software bill of materials (SBOM). The system allows software publishers to create a software component and generate an SBOM that describes its dependencies. A web API then securely stores the SBOM on a distributed file system and publishes a hash of the SBOM to a public blockchain. When the software component is updated, a new SBOM is generated, and a signed hash of the new SBOM is stored in a new node on the blockchain. This preserves the history and auditability of the application's SBOMs. Third parties may query the web API to obtain the SBOM while ensuring the integrity and provenance of the information.

19 Claims, 21 Drawing Sheets

(56) References Cited

U.S. PATENT DOCUMENTS

2024/0126530 A1\* 4/2024 Kairali .................... G06F 8/61
2024/0152625 A1\* 5/2024 Bar .................... G06Q 10/0875

OTHER PUBLICATIONS

"CVE Binary Tool quick start / README", Retrieved from: https://web.archive.org/web/20221208020950/https://cve-bin-tool.readthedocs.io/en/latest/README.html, Dec. 8, 2022, 9 Pages.

"National Telecommunications and Information Administration", Retrieved from: https://www.ntia.doc.gov/, Retrieved Date: Jun. 3, 2022, 4 Pages.

"SBOM FAQ", In Journal of NTIA Multistakeholder Process on Software Component Transparency, Nov. 16, 2020, pp. 1-12.

"Software Bill of Materials", Retrieved from: https://www.ntia.doc.gov/SBOM, Retrieved Date: Jun. 3, 2022, 6 Pages.

"Survey of Existing SBOM Formats and Standards", Retrieved from: https://www.ntia.gov/files/ntia/publications/ntia_sbom_formats_and_standards_whitepaper_-_version_20191025.pdf, Oct. 24, 2019, pp. 1-31.

Muiri, Eamonn O., "Framing Software Component Transparency", In Journal of NTIA Multistakeholder Process on Software Component Transparency, Sep. 3, 2019, pp. 1-24.

Rispens, Sybe Izaak, "Why the World Needs a Software Bill of Materials Now", Retrieved from: https://drrispens.medium.com/why-the-world-needs-a-software-bill-of-materials-now-5a565df65dff, Mar. 14, 2021, 16 Pages.

Shea, Georgianna, "A Software Bill of Materials Is Critical for Comprehensive Risk Management", In TCIL Technical Note, Sep. 29, 2021, pp. 1-18.

\* cited by examiner

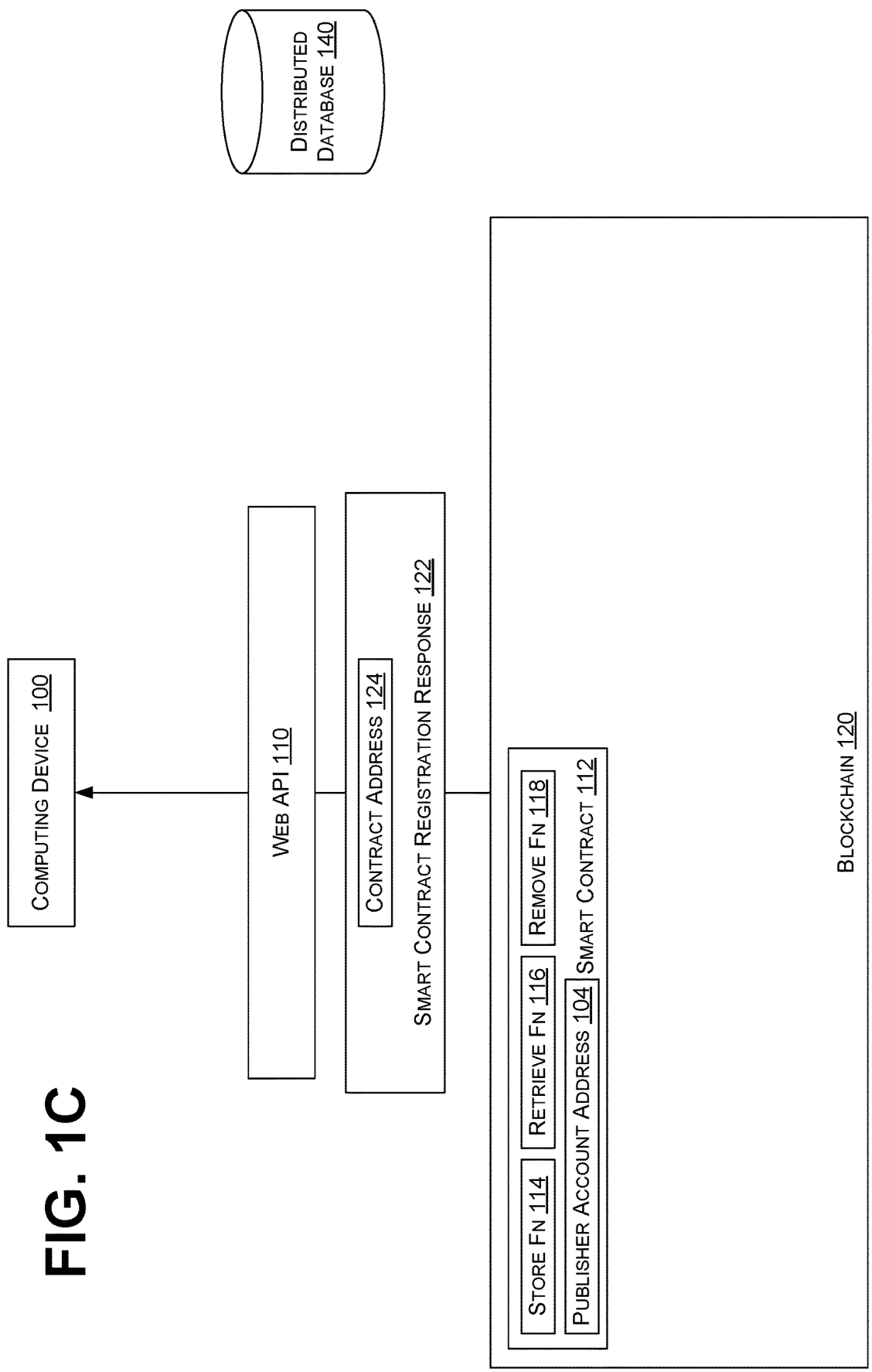

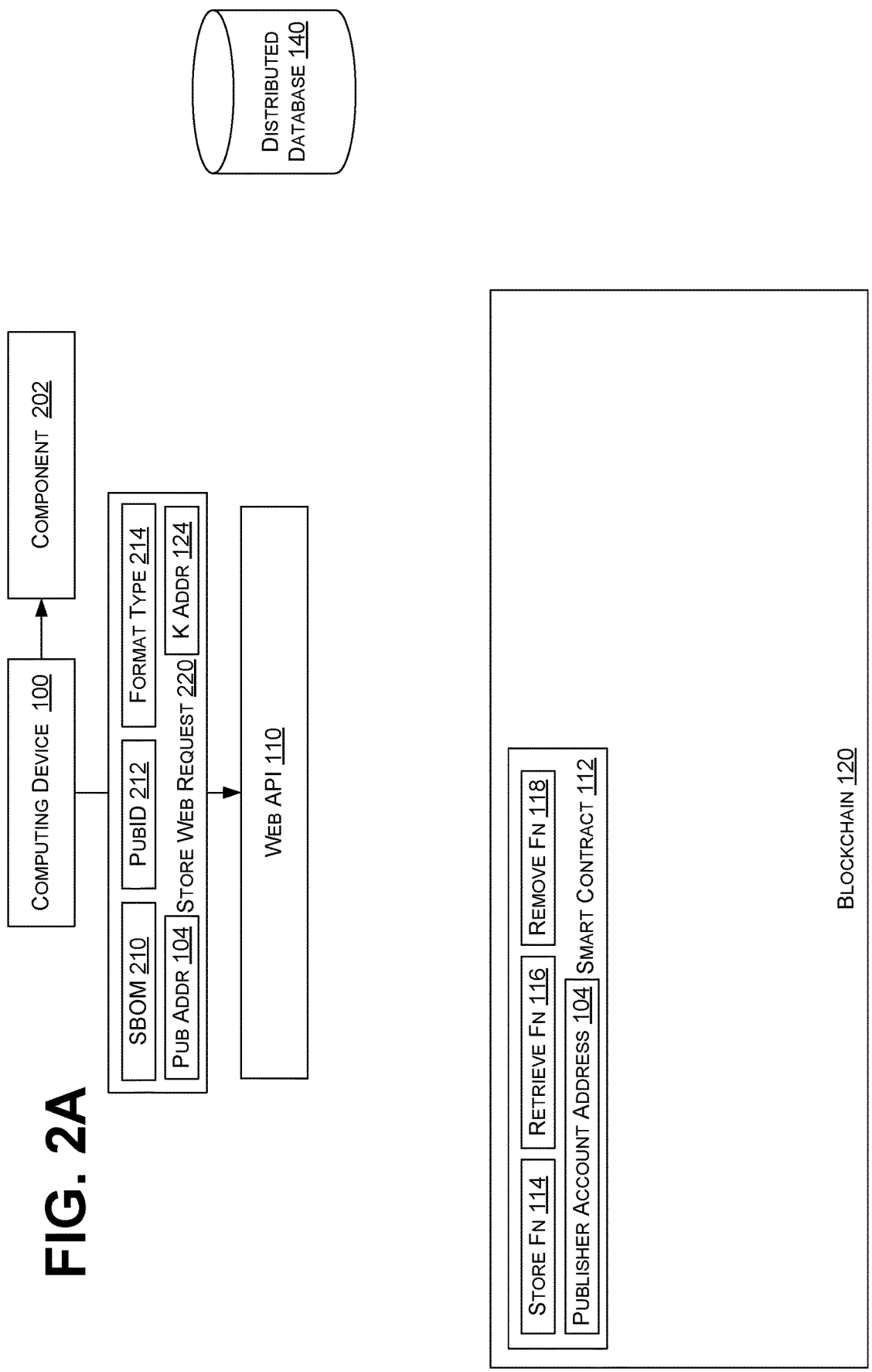

STORAGE AND CONSUMPTION OF SOFTWARE BILL OF MATERIALS ON PUBLIC BLOCKCHAIN

BACKGROUND

Software applications often utilize third-party components. Third-party components provide specific functionality that can be used by software developers to enhance their own applications without having to develop the functionality from scratch. However, third-party components can also introduce security risks. For example, an application may utilize an outdated component that has not received the latest security patch. Third-party components may also be insecurely configured, e.g., to allow unauthenticated access or use weak encryption. For these reasons, it is critical when evaluating the security of an application to understand the third-party components it utilizes on.

It is with respect to these and other considerations that the disclosure made herein is presented.

SUMMARY

Disclosed is a secure and distributed system for storing and consuming software bill of materials (SBOM). The system allows software publishers to create a software component and generate an SBOM that describes its dependencies. A web API then securely stores the SBOM on a distributed file system and publishes a hash of the SBOM to a public blockchain. When the software component is updated, a new SBOM is generated, and a signed hash of the new SBOM is stored in a new node on the blockchain. This preserves the history and auditability of the application's SBOMs. Third parties may query the web API to obtain the SBOM while ensuring the integrity and provenance of the information.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIGS. 1A-1C illustrate registering a smart contract that stores and retrieves SBOM hashes on a public blockchain.

FIGS. 2A-2G illustrate using a web API to store an SBOM on distributed systems.

DETAILED DESCRIPTION

One technique for describing the libraries and other resources that an application or a container utilizes is a software bill of materials (SBOM). An SBOM is an electronic document or machine-readable file that lists of all the components and dependencies that are used in a particular container or software application. It provides a detailed inventory of the software components and their relationships with each other, including open source and third-party libraries, frameworks, and other software tools.

The purpose of an SBOM is to help organizations manage and track the software components used in their applications, including identifying any potential security vulnerabilities, licensing issues, or other risks. By creating an inventory of software components, organizations can better manage their software supply chain and ensure the security and integrity of their applications.

There are a number of SBOM standards that define how an SBOM lists an application's constituent components. However, there is currently no standardized technique for storage and consumption of SBOM. And in particular there is no technique for publishing SBOM files in a way that ensures their integrity and provenance.

Storing SBOMs on a public blockchain provides several advantages for software supply chains. SBOMs enhance transparency and traceability, which helps ensure that all components of the software are accounted for, reducing the risk of vulnerabilities and improving the overall quality of the software. Blockchain-based storage is decentralized and immutable, meaning that it cannot be tampered with or deleted, and there is no single point of failure. This makes it a more secure option than traditional methods that rely on a single entity. Finally, by removing the need for a central entity to manage and maintain the records, operational costs can be reduced, providing an efficient and cost-effective solution.

Figure 1A:
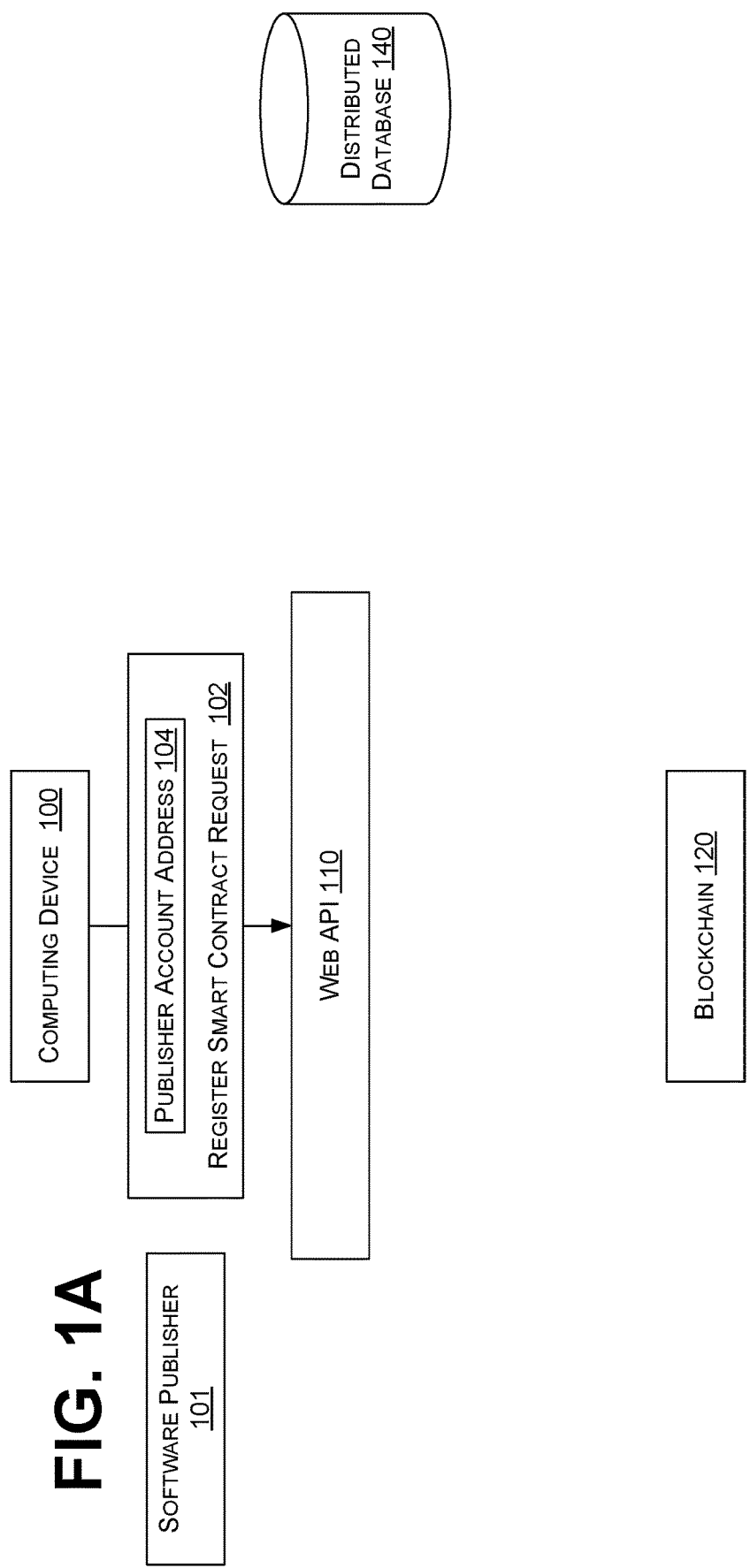

FIG. 1A illustrates computing device 100 sending a register smart contract request 102 to Web API 110. Computing device 100 may send register smart contract request 102 in anticipation of publishing software bill of materials (SBOM) files to distributed systems via Web API 110. Computing device 100 is often operated by a software publisher 101 that would like to periodically provide access to SBOMs that it generates.

In some configurations, Web API 110 is a RESTful API (Representational State Transfer Application Programming Interface). A RESTful API is a type of web API that is designed to use HTTP (HyperText Transfer Protocol) requests to perform CRUD (Create, Read, Update, Delete) operations on files over the web. In a RESTful API, a resource is uniquely identified by a URI (Uniform Resource Identifier) and can be accessed via HTTP methods such as GET (to retrieve resource data), POST (to create new resources), PUT (to update existing resources), and DELETE (to remove resources).

Blockchain 120 and distributed database 140 are two examples of distributed systems that may be leveraged by Web API 110 to securely store and distribute SBOMs. Blockchain 120 is a decentralized ledger of digital transactions that is open to anyone to participate and view, without requiring permission or credentials. It is a transparent and immutable system of recording data that is maintained by a network of computers, or nodes, distributed around the world.

In a public blockchain, transactions are validated and recorded on the network by a consensus mechanism, typically through a process called mining or staking, which involves solving complex mathematical problems to verify the validity of transactions and add them to the blockchain. Examples of public blockchains include Bitcoin, Ethereum, and Litecoin. Public blockchains are often used for cryptocurrencies, but they can also be used for other applications, such as voting systems, supply chain management, and identity verification.

Blockchain 120 supports smart contracts. A smart contract is a self-executing program that is written in a programming language and deployed on the blockchain. Smart contracts allow developers to create decentralized applications that run autonomously without the need for intermediaries.

Distributed database 140 is a database system that is spread across multiple computers or nodes connected by a network. In a distributed database, the data is stored on different nodes, which allows for better security, scalability, reliability, and performance compared to a centralized database. While distributed databases are discussed throughout this document, centralized databases are similarly contemplated anywhere a decentralized database is mentioned.

Distributed database 140 can be more secure than a centralized database in several ways. A distributed database does not have a single point of failure. With a centralized database, if the database server fails, all the data becomes unavailable. In contrast, with a distributed database, the data is stored on multiple nodes, and even if one or more nodes fail, the data can still be accessed from other nodes, reducing the risk of a complete data loss.

Distributed databases are also more resistant to data breaches. In a centralized database, if a hacker gains access to the database server, they can potentially access all the data in the database. With a distributed database, the data is stored across multiple nodes, and so breaching one node does not result in access to all or even some of the data. Furthermore, access control mechanisms can be implemented at both the node and database level, reducing the risk of unauthorized access. Distributed databases also provide improved data integrity and built-in fault tolerance and disaster recovery.

One example of a distributed database is the InterPlanetary File System (IPFS). The IPFS is a protocol and network designed to create a peer-to-peer method for storing and accessing files, websites, and other data. IPFS aims to address some of the challenges associated with the traditional client-server model of accessing and storing data on the internet. With IPFS, files are addressed using content-addressing instead of location-addressing. This means that a file is identified by a cryptographic hash of its contents rather than by its location on a specific server or computer. When a file is added to the IPFS network, it is broken up into small pieces and stored on multiple nodes, which ensures that the file is always available even if some nodes go offline.

Register smart contract request 102 contains publisher account address 104, a unique identifier associated with software publisher 101 on blockchain 120. Publisher account address 104 may be a sequence of numbers and/or letters that is generated when software publisher 101 registered with blockchain 120.

Figure 1B:
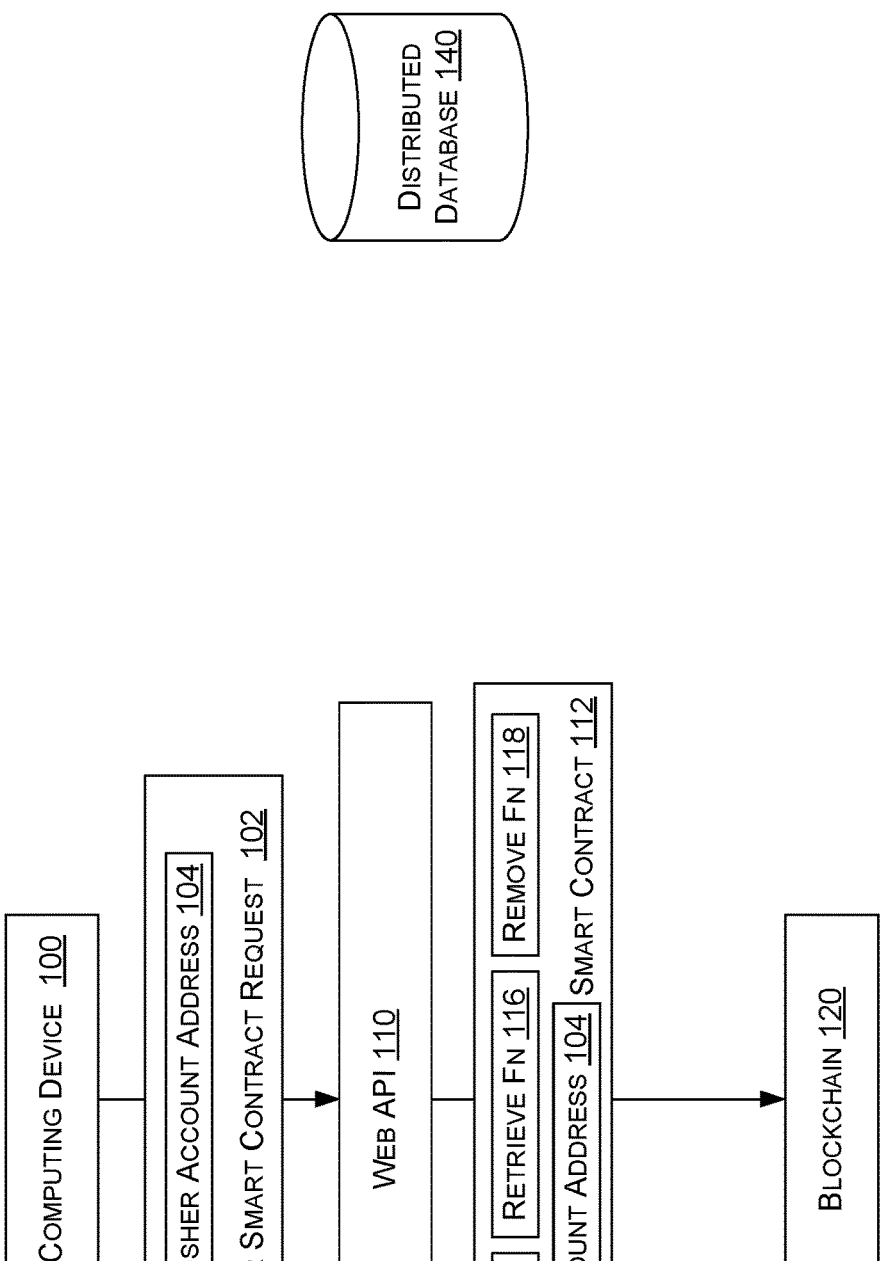

FIG. 1B illustrates Web API 110 sending the requested smart contract 112 to blockchain 120. Smart contract 112 includes publisher account address 104 and three functions: store function 114, retrieve function 116, and remove function 118, although smart contract 112 is not limited to these functions and may include more or fewer.

Store function 114 may be invoked to create or update an SBOM on blockchain 120. Retrieve function 116 may be invoked to obtain a copy of a particular SBOM stored on blockchain 120. Remove function 118 may be invoked to delete an SBOM from blockchain 120. These functions are described in more detail below in conjunction with FIGS. 2-5. By default, store function 114 and remove function 118 will not perform any action unless invoked by the entity that created it.

FIG. 1C illustrates smart contract 112 stored on blockchain 120. In some configurations, in response to registering smart contract 112, blockchain 120 returns smart contract registration response 122 to Web API 110. Smart contract registration response 122 includes contract address 124. Contract address 124 is an identifier generated by blockchain 120 that is associated with smart contract 112. Contract address 124 may be provided when invoking functions 114-118 of smart contract 112.

FIG. 2A illustrates computing device 100 generating component 202 and SBOM 210.

Component 202 may refer to any piece of software, such as an application, library, container, or the like. A software container is a lightweight, standalone, and executable package of software that contains everything needed to run an application or service, including the code, runtime, system tools, libraries, and settings. As standalone packages, containers often have a large number of dependencies, and so the benefits of publishing and retrieving an SBOM are particularly significant for a container.

SBOM 210 describes the dependencies of component 202. As such, SBOM 210 is a detailed list of all the software components and their versions that are used by component 202. In this way, SBOM 210 is similar to a parts list or bill of materials that is used in manufacturing, but instead of listing physical components, it lists the software components that make up component 202. Computing device 100 may generate SBOM 210 during a build process, enabling the publication of SBOM 210 to be automated.

In order to store SBOM 210 on blockchain 120, computing device 100 sends store web request 220 to Web API 110. Store web request 220 may be implemented with an HTTP POST request when Web API 110 is a RESTful interface. This is consistent with RESTful interfaces creating a record with the POST command. Store web request 220 may include SBOM 210, a publisher identifier (PubID) 212, format type 214, publisher address 104, and contract address 124. Some or all of these items may be included in HTTP headers when submitting store web request 220.

Publisher identifier 212 may be a unique identifier generated by publisher 101. Publisher identifier 212 may be associated with publisher address 104, which is the identifier of publisher 101 on blockchain 120.

Format type 214 indicates whether SBOM 210 is one of a number of standardized SBOM formats. Some common SBOM formats include CycloneDX, a lightweight XML or JSON format for describing software components, dependencies, and metadata, and SPDX (Software Package Data Exchange), a standard for exchanging software package metadata which provides a structured format for describing software components, licenses, and copyrights. SPDX may be stored as a tag/value (.spdx) format, JSON (JavaScript Object Notation), YAML (YAML Ain't Markup Language), RDF (Resource Description Format), or spreadsheet (.xls). Publisher address 104 and contract address 124 are blockchain generated identifiers that specify which contract to invoke on blockchain 120 and on behalf of which publisher.

Figure 2B:
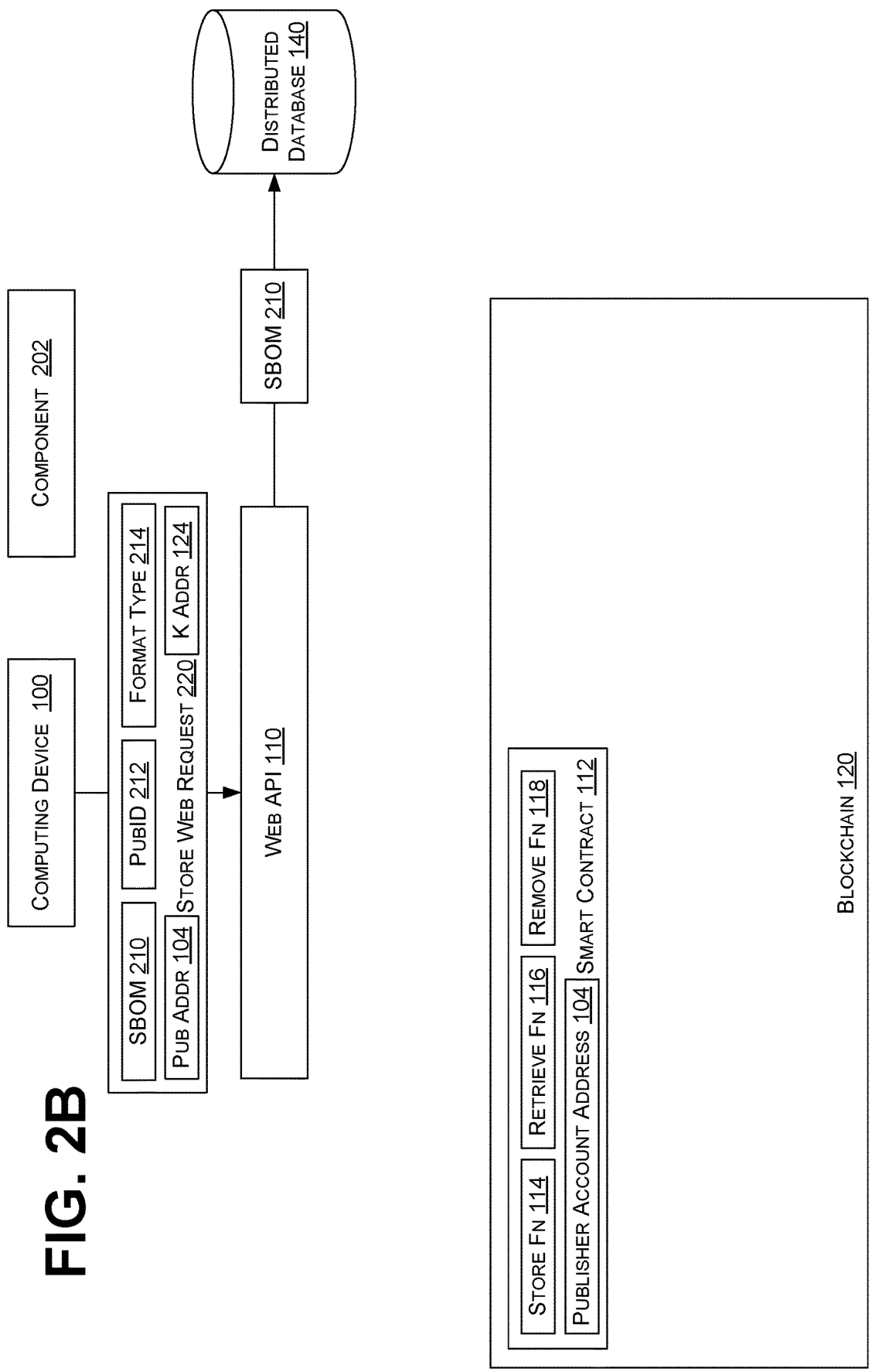

FIG. 2B illustrates storing SBOM 210 on distributed database 140. SBOM 210 may be too large to practically be stored directly on blockchain 120. As such, SBOM 210 itself may be stored on distributed database 140, while a hash of SBOM 210 is stored on blockchain 120. However, it is also contemplated that SBOM 210 may be stored directly on blockchain 120. Store web request 220 remains pending while SBOM 210 is stored in distributed database 140.

Figure 2C:
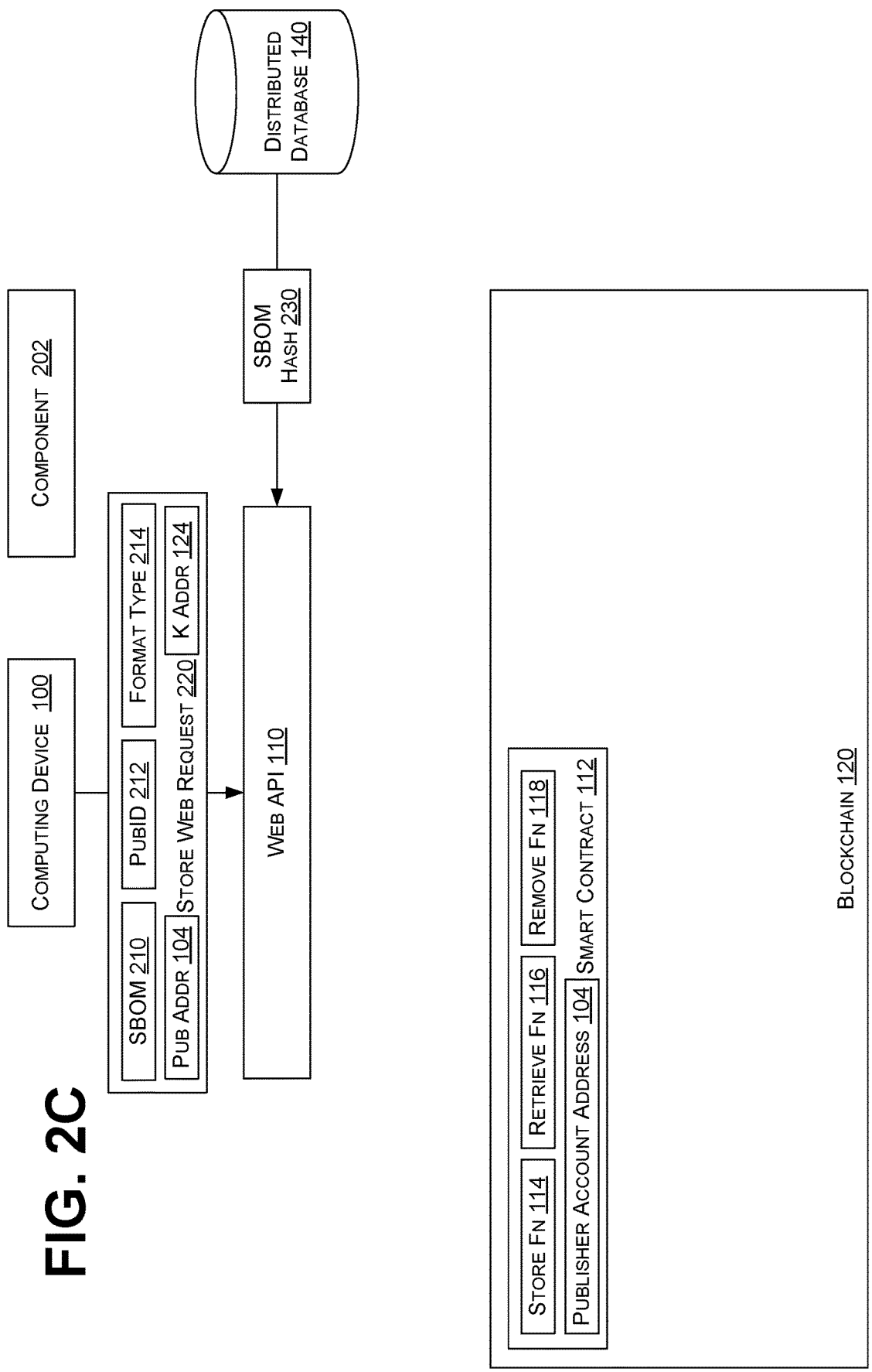

FIG. 2C illustrates Web API 110 receiving SBOM hash 230 from distributed database 140. As illustrated, distributed database 140 generates SBOM hash 230 in response to the request to store SBOM 210. When distributed database 140 is the InterPlanetary File System or equivalent, SBOM hash 230 may be the hash used by IPFS to identify SBOM 210. Additionally, or alternatively, SBOM hash 230 may be computed by Web API 110, computing device 100, or other component.

A hash of a file is a unique identifier that is generated by applying a hash function algorithm to the contents of the file. A hash function is a mathematical algorithm that takes an input data (such as a file) and produces a fixed-size output value, called a hash or message digest. The hash of a file is unique or nearly unique to the contents of the file, which means that any change to the file's contents will result in a different hash value. Typically, a hash of a file is represented with fewer bytes than the file itself. This limits the amount of storage used on blockchain 120.

Figure 2D:
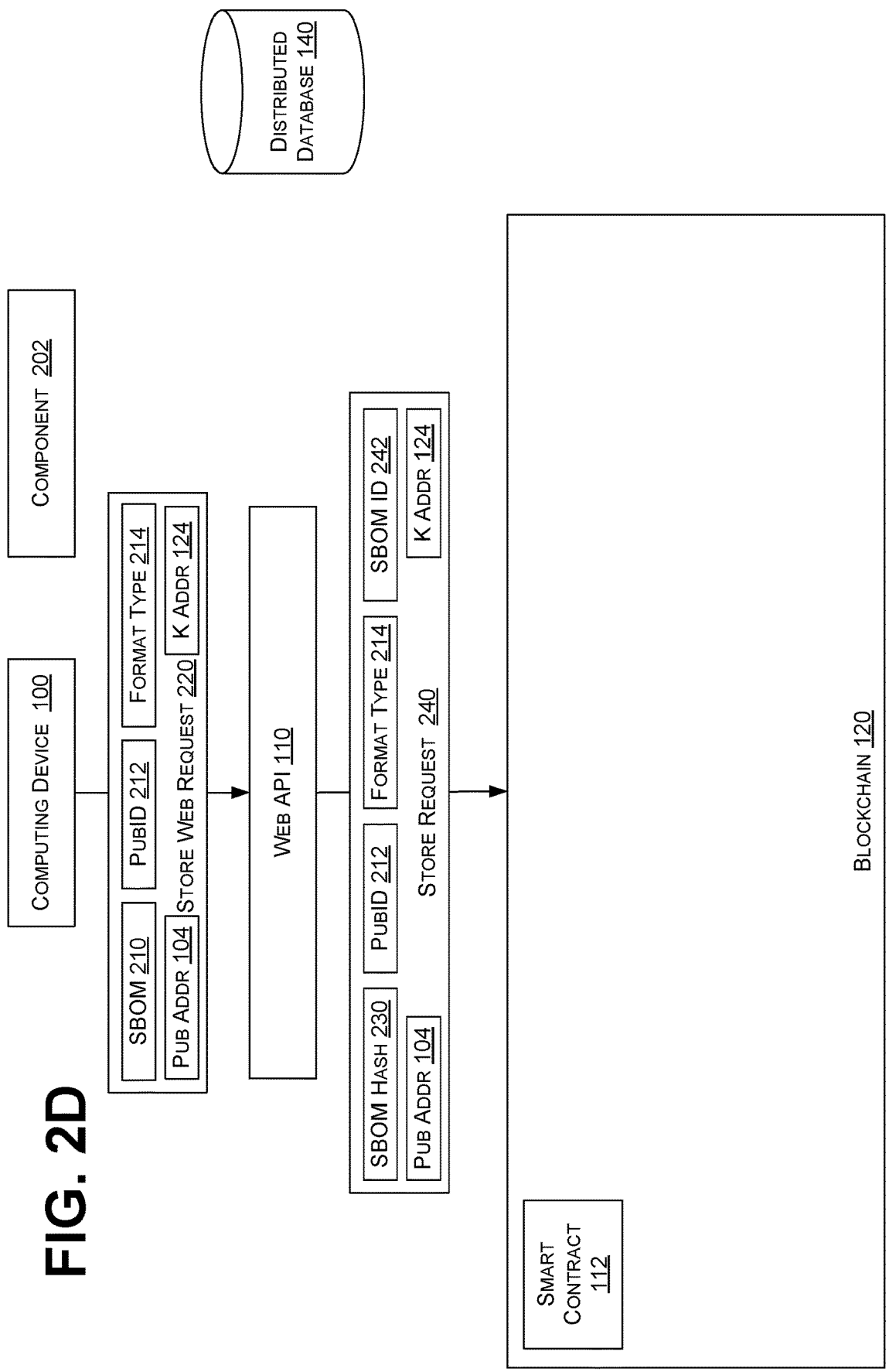

FIG. 2D illustrates Web API 110 generating store request 240 based on the contents of store web request 220 received from computing device 100 and the SBOM hash 230 received from distributed database 140. Store request 240 invokes store function 114 of smart contract 112. Specifically, store request 240 includes SBOM hash 230 as received from distributed database 140, or however SBOM hash 230 is generated. Store request 240 may also include publisher identifier 212, SBOM format type 214, publisher address 104, and contract address 124 as received in store web request 220.

While generating store request 240, Web API 110 may generate a unique SBOM identifier 242 that refers to the SBOM that is currently associated with component 202. Additionally, or alternatively, computing device 100 generates SBOM identifier 242 and supplies it with store web request 220. As the SBOM associated with component 202 is updated, SBOM identifier 242 may be used to refer to the most recently stored SBOM associated with component 202.

Figure 2E:
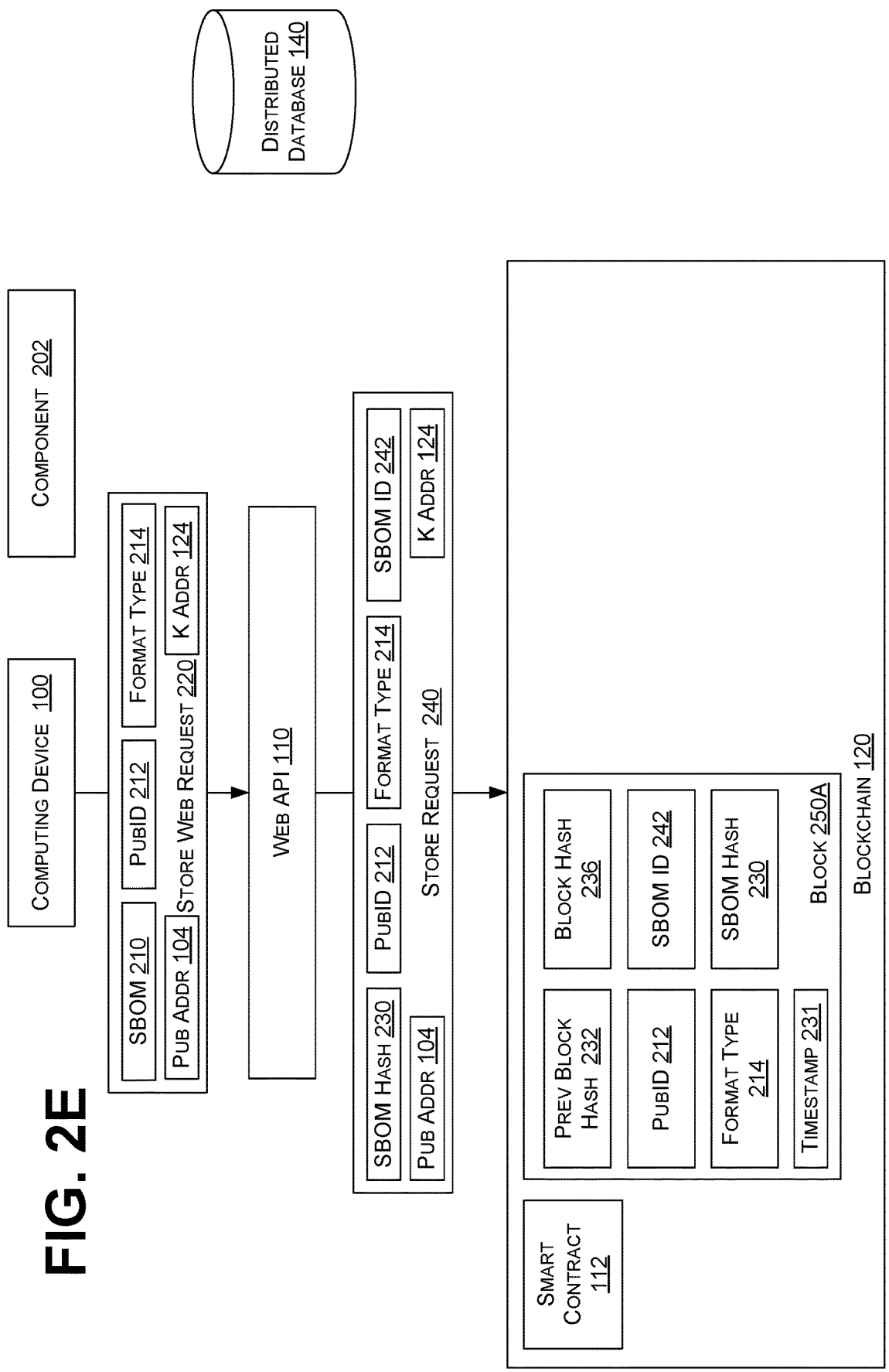

FIG. 2E illustrates a block 250A of blockchain 120 that was created by invoking store function 114. Block 250A contains the SBOM hash of the SBOM that was most recently submitted to Web API. In some configurations, publisher address 104 and/or contract address 124 are used by blockchain 120 to invoke the appropriate store function 114.

Block 250A stores data received from store request 240. For example, block 250A may include previous block hash 232, block hash 236, publisher identifier 212, SBOM identifier 242, SBOM format type 214, SBOM hash 230, and timestamp 231. In some configurations, publisher identifier 212 and SBOM format type 214 originate from store web request 220, SBOM hash 230 is received from distributed database 140, and SBOM identifier originated in Web API 110.

Timestamp 231 indicates when SBOM 210 was submitted, enabling different SBOMs associated with the same component 202 to be distinguished and enabling the most recently submitted SBOM to be identified. Timestamp 231 may have been generated by any of the components that provide data included in store request 240, but would most commonly be generated by Web API 110.

Figure 2F:
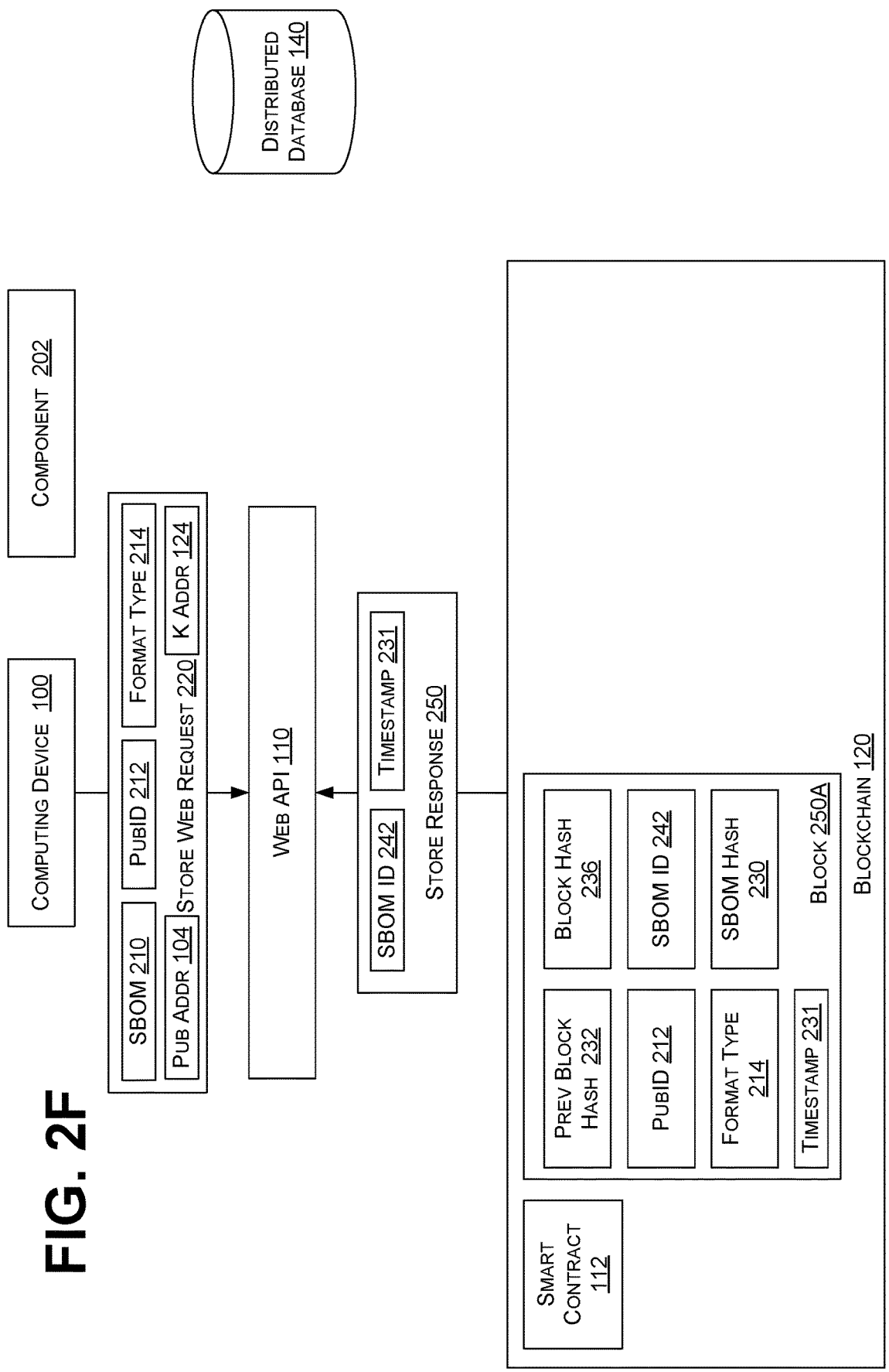

FIG. 2F illustrates store response 250 being returned to Web API 110. Store Response may be generated in response to processing store request 240. In some configurations, store response 250 includes SBOM identifier 242, which Web API 110 may use when sending a response to store web request 220. In other configurations, Web API retains SBOM identifier 242 so that it does not need to be returned as part of store response 250. Store response 250 may also include timestamp 231.

Figure 2G:
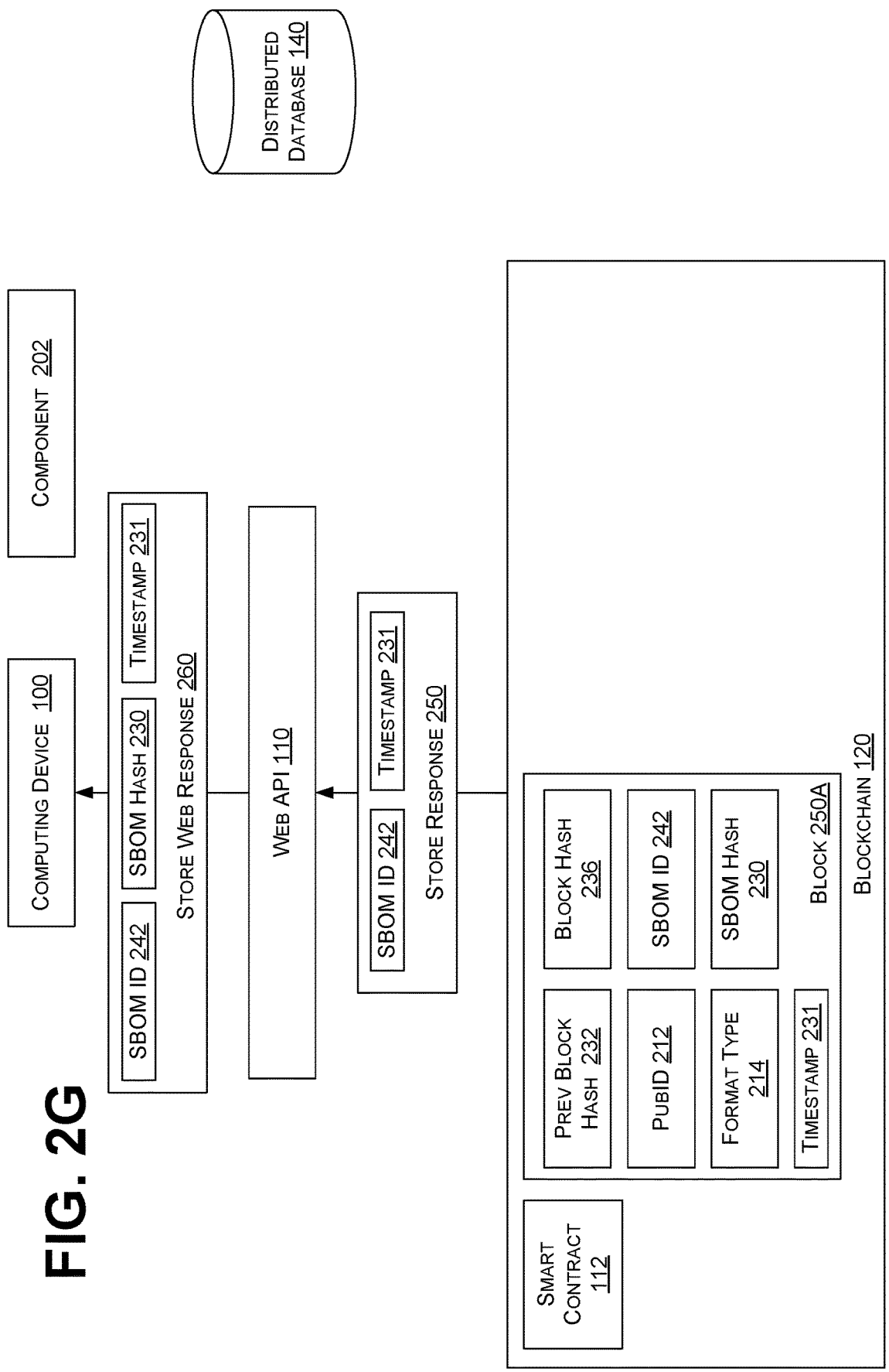

FIG. 2G illustrates Web API 110 providing store web response 260 to computing device 110. Store web response 260 may include SBOM identifier 242, SBOM hash 230, and timestamp 231. Computing device 100 may store SBOM identifier 242 for future use. SBOM identifier 242 may be used by third parties to retrieve a copy of SBOM 210. To facilitate this use by third parties, SBOM identifier 242 may be published to a website associated with component 202. Computing device 100 may also use SBOM identifier 242 when asking Web API 110 to replace an existing SBOM with an updated version, or when asking Web API 110 to delete SBOM 210 from distributed database 140 and blockchain 120.

Figure 3A:
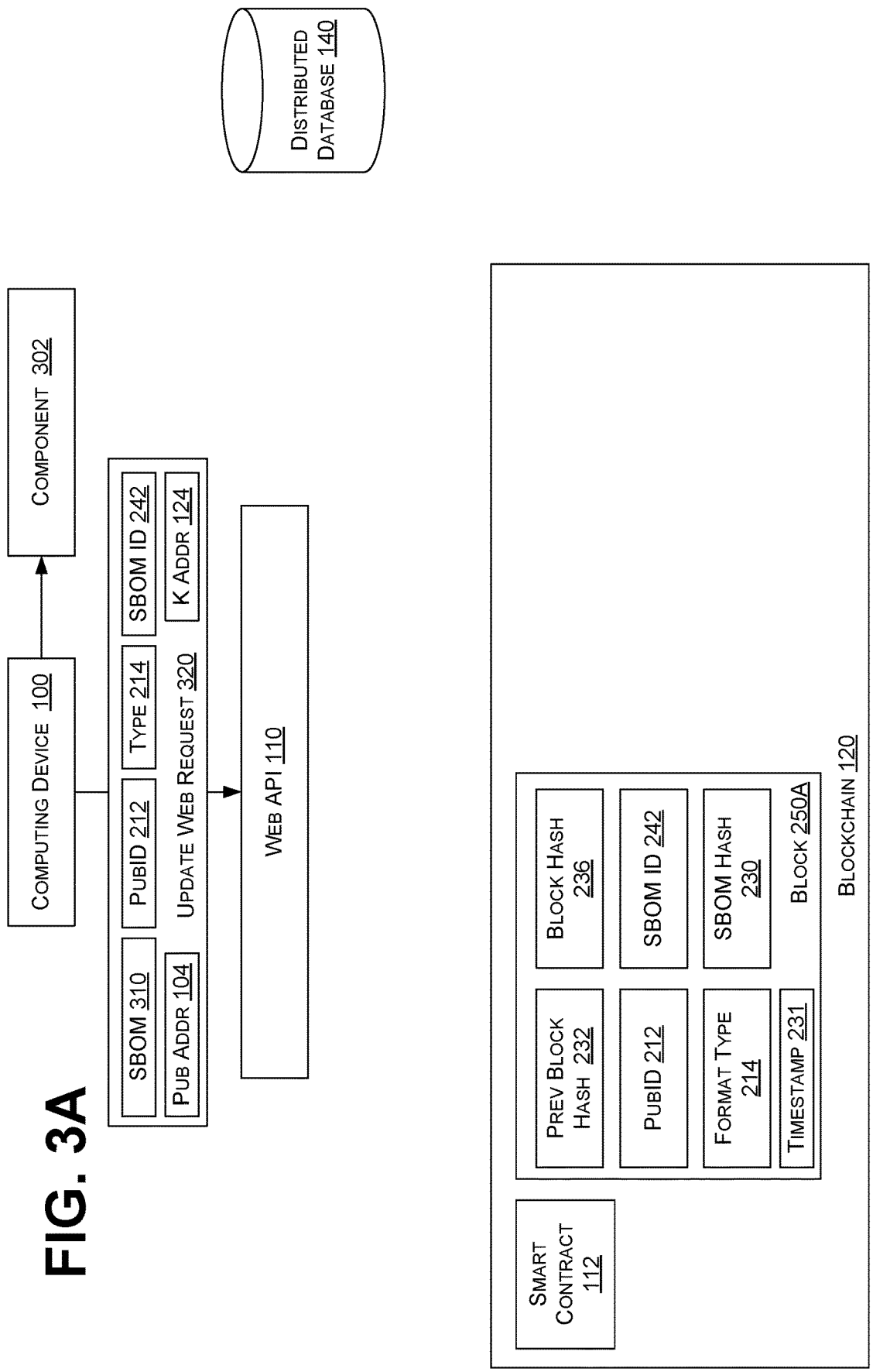
FIGS. 3A-3B illustrate using the web API to update the SBOM on the distributed systems.

FIG. 3A illustrates computing device 100 providing update web request 320 to Web API 110. Update web request 320 may be submitted as an HTTP PUT request when Web API 110 is a RESTful interface. Update web request 320 provides an updated SBOM 310 for component 302, which is itself a new version of component 202. Computing device 100 indicates that SBOM 310 is an updated version of SBOM 210 by providing SBOM identifier 242 as part of update web request 320. SBOM identifier 242 remains the same for any SBOM associated with a version of component 202.

Figure 3B:
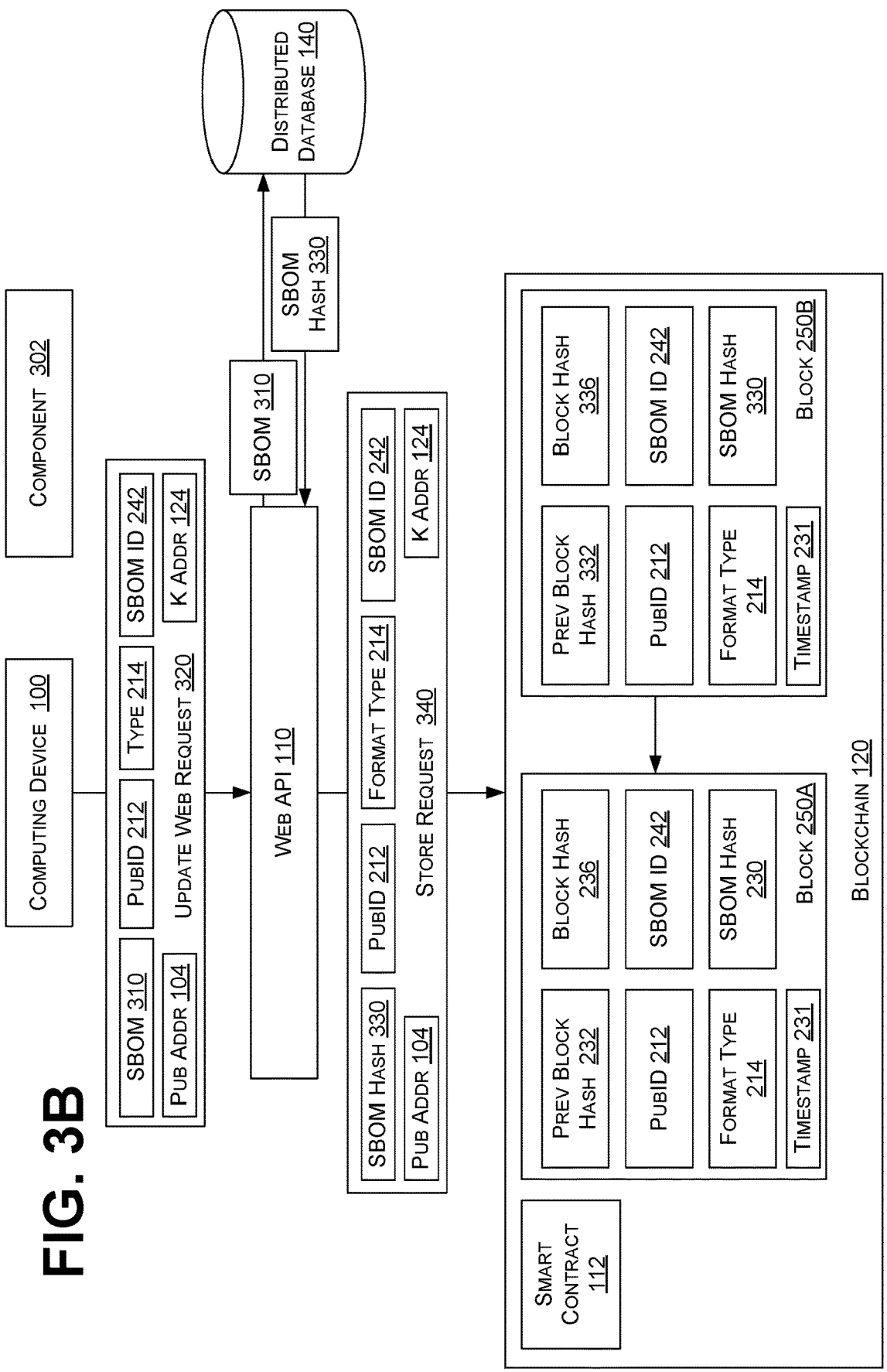

FIG. 3B illustrates Web API generating store request 340 in response to receiving update web request 320. In response to update request 320, Web API 110 submits SBOM 310 to distributed database 140 and receives SBOM hash 330 in return, as discussed above in conjunction with FIGS. 2B-2C. Web API 110 then generates store request 340, which is similar to store request 240. Store request 340 may invoke store function 114 of smart contract 112. Additionally, or alternatively, store request 340 may invoke an update function also defined by smart contract 112.

Invoking the store function 114 a second time for the same SBOM identifier results in creation of block 250B on blockchain 120. Block 250B has a hash 336 that identifies it, as well as a previous block hash 332 that refers to second most recently uploaded SBOM associated with a version of component 202. As illustrated, previous block hash 332 contains block hash 236 of block 250A.

Block 250B also includes SBOM hash 330—the hash of component 302, which is a new version of component 202. Publisher identifier 212, SBOM identifier 242, and format type 214 are the same as is found in block 250A. By storing successive SBOMs associated with the same component in different blocks, SBOMs are still available for older versions of component 202.

In some configurations, storing format type 214 in block 250 allows multiple SBOMs of different formats to be stored for the same version of component 202. Each SBOM of a different format may be stored in a different block 250 on blockchain 120.

Figure 4A:
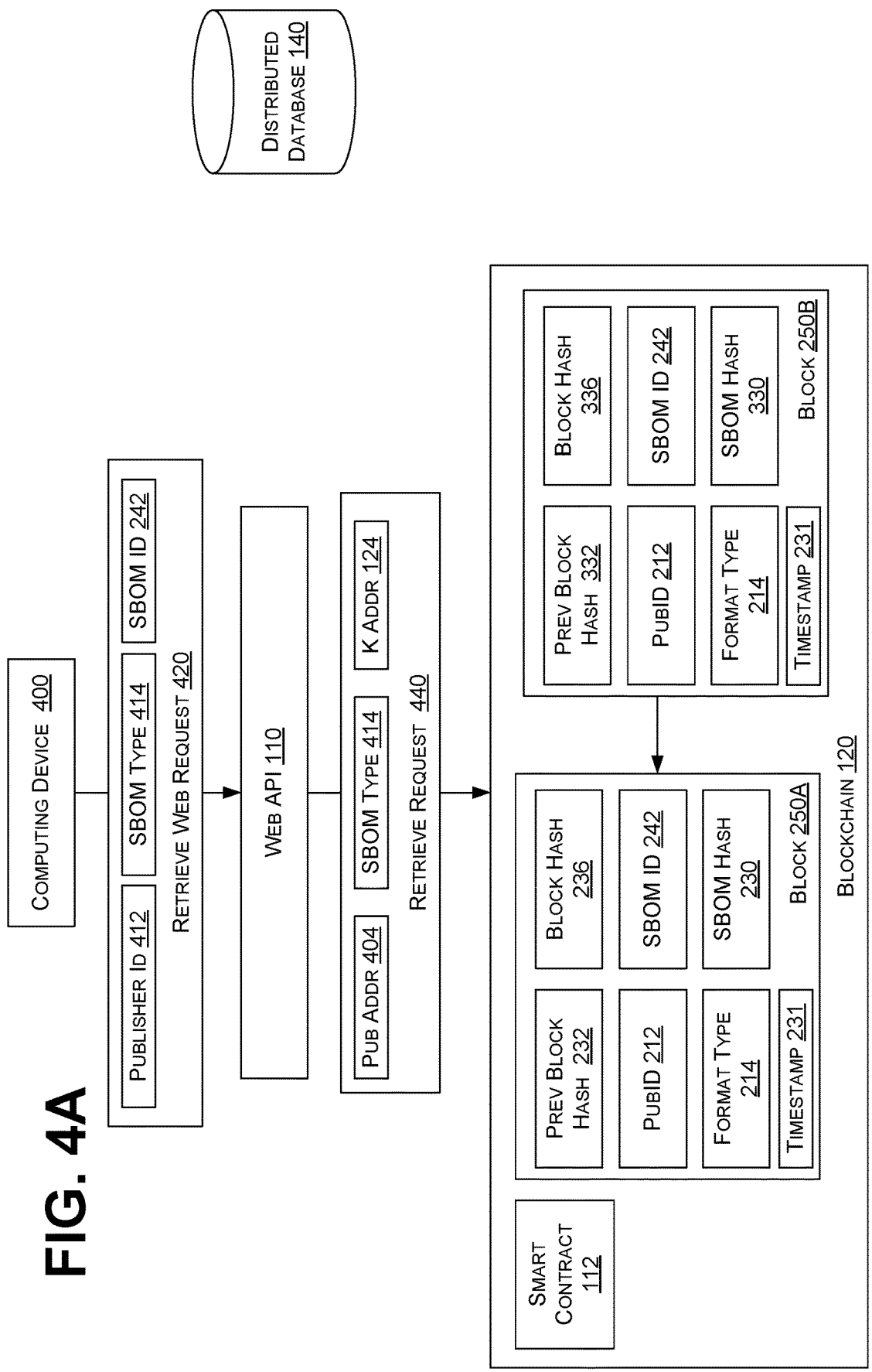
FIGS. 4A-4D illustrate retrieving an SBOM from the distributed systems.

FIG. 4A illustrates computing device 400 submitting retrieve web request 420 to Web API 110. Retrieve web request 420 includes publisher identifier 412, SBOM format type 414, and SBOM identifier 242. Computing device 400 may be from a different organization than computing device 100, and so computing device may have fewer permissions for accessing SBOM 310 or SBOM 210 than computing device 100.

Web API 110 responds to retrieve web request 420 by submitting retrieve request 440 to blockchain 120. Retrieve request 440 includes publisher address 404, SBOM format type 414, and contract address 124. Publisher address 404 is a blockchain generated identifier of the identity that retrieve request 440 assumes. SBOM format type 414 is similar to format type 214. Contract address 124 is the blockchain generated identifier of smart contract 112.

Figure 4B:
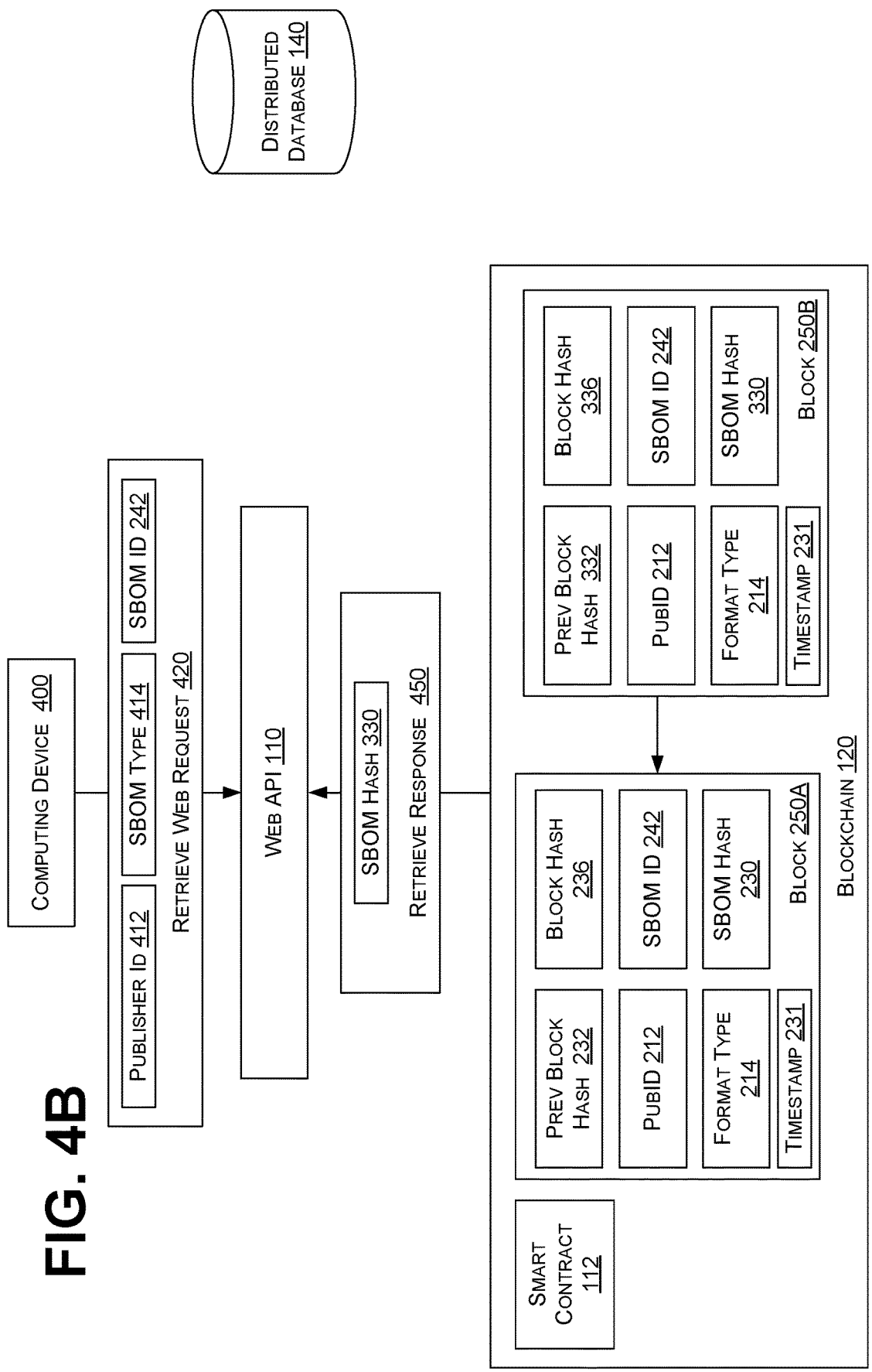

FIG. 4B illustrates blockchain 120 responding to retrieve request 440. Blockchain 120 processes retrieve request 440 by invoking retrieve function 116 of smart contract 112. Retrieve function 116 generates retrieve response 450, which contains SBOM hash 330. Retrieve response 450 is provided to Web API 110.

Figure 4C:
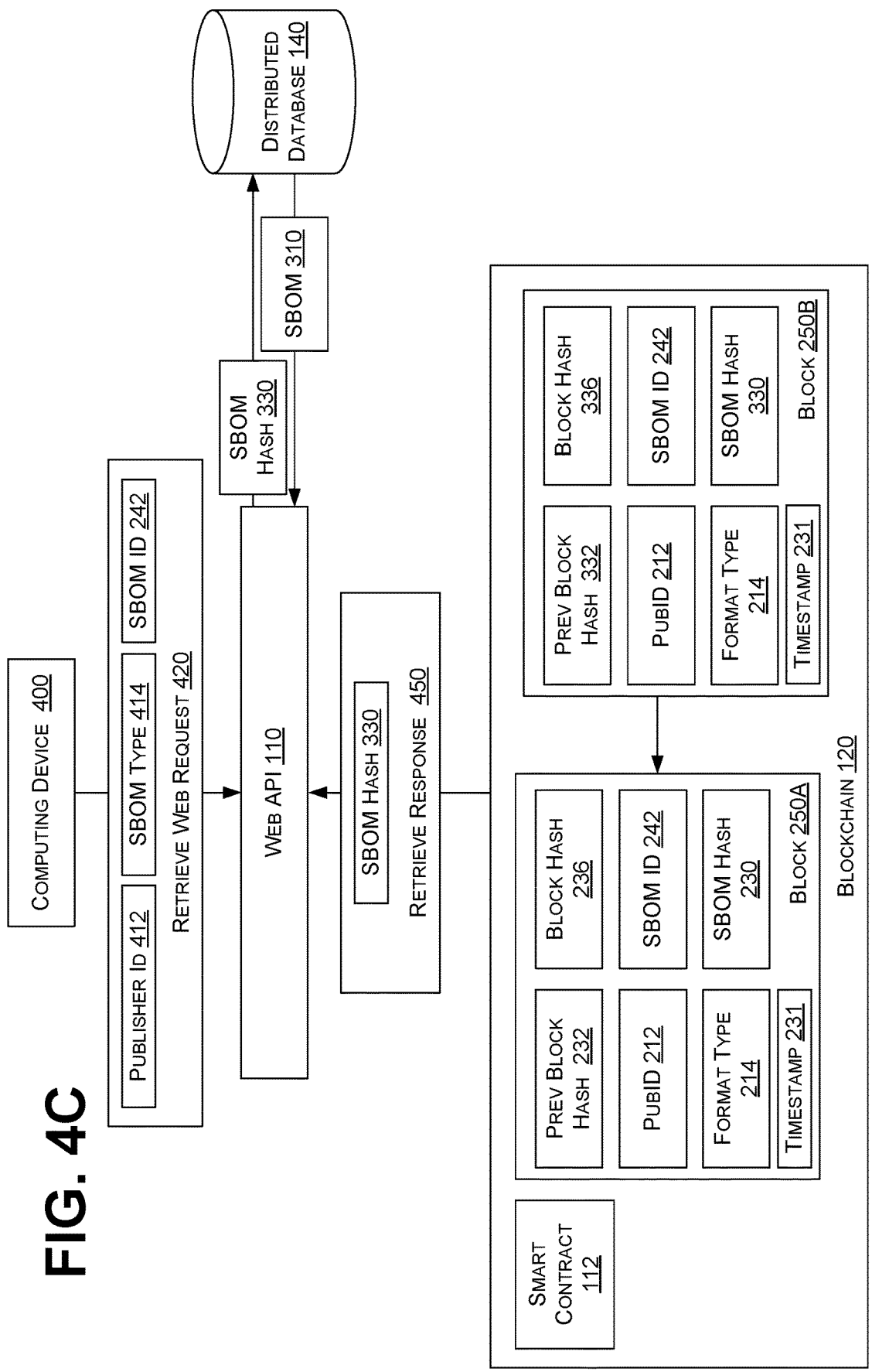

FIG. 4C illustrates Web API 110 obtaining SBOM 310 from distributed database 140. Web API 110 provides distributed database 140 with SBOM hash 310 as part of a query. Distributed database uses SBOM hash 330 to retrieve SBOM 310, and returns SBOM 310 to Web API 110.

Figure 4D:
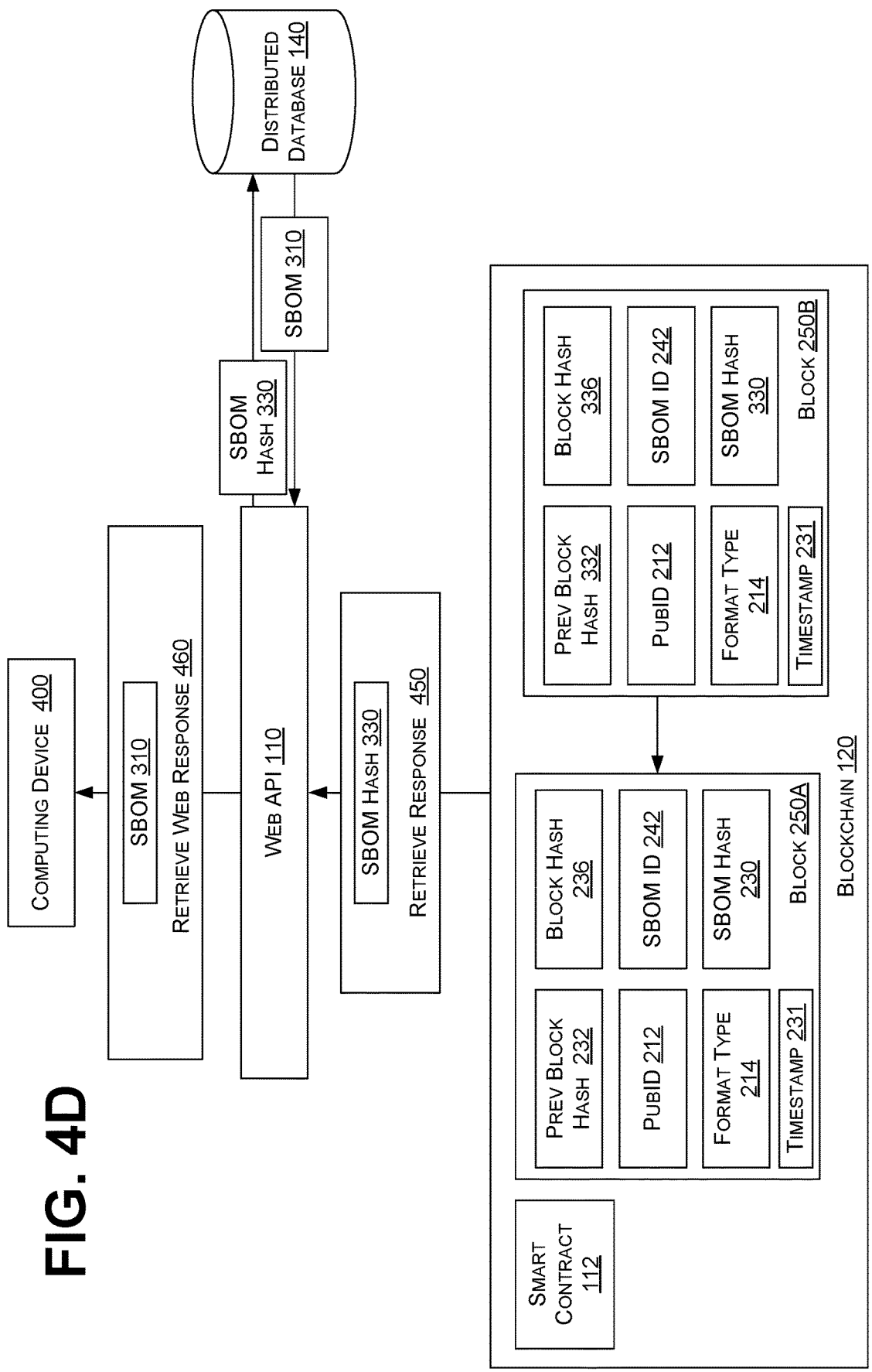

FIG. 4D illustrates Web API 110 providing retrieve web response 460 to computing device 400. Retrieve web response includes SBOM 310 which was retrieved from distributed database 140. Computing device 400 may use SBOM 310 to programmatically determine if the dependencies of component 302 meet minimum security standards, among other operations.

Figure 5A:
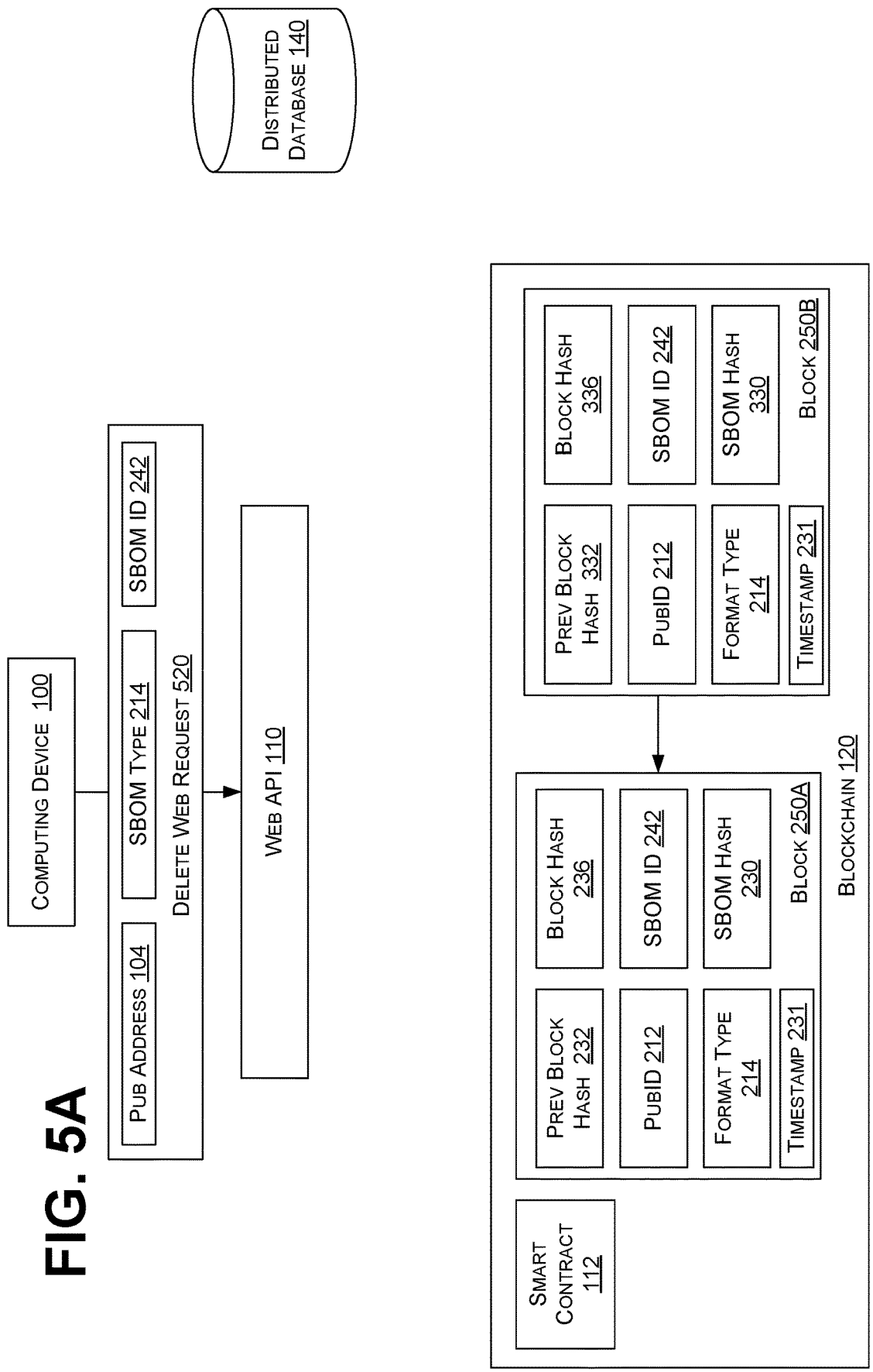
FIGS. 5A-5B illustrate deleting an SBOM from the distributed systems.

FIG. 5A illustrates computing device 100 providing delete web request 520 to Web API 110. Delete web request 520 includes publisher address 104, SBOM format type 214, and SBOM identifier 242. Only delete web requests submitted with the publisher address 104 that stored the SBOM identified by SBOM 242 will be allowed.

Figure 5B:
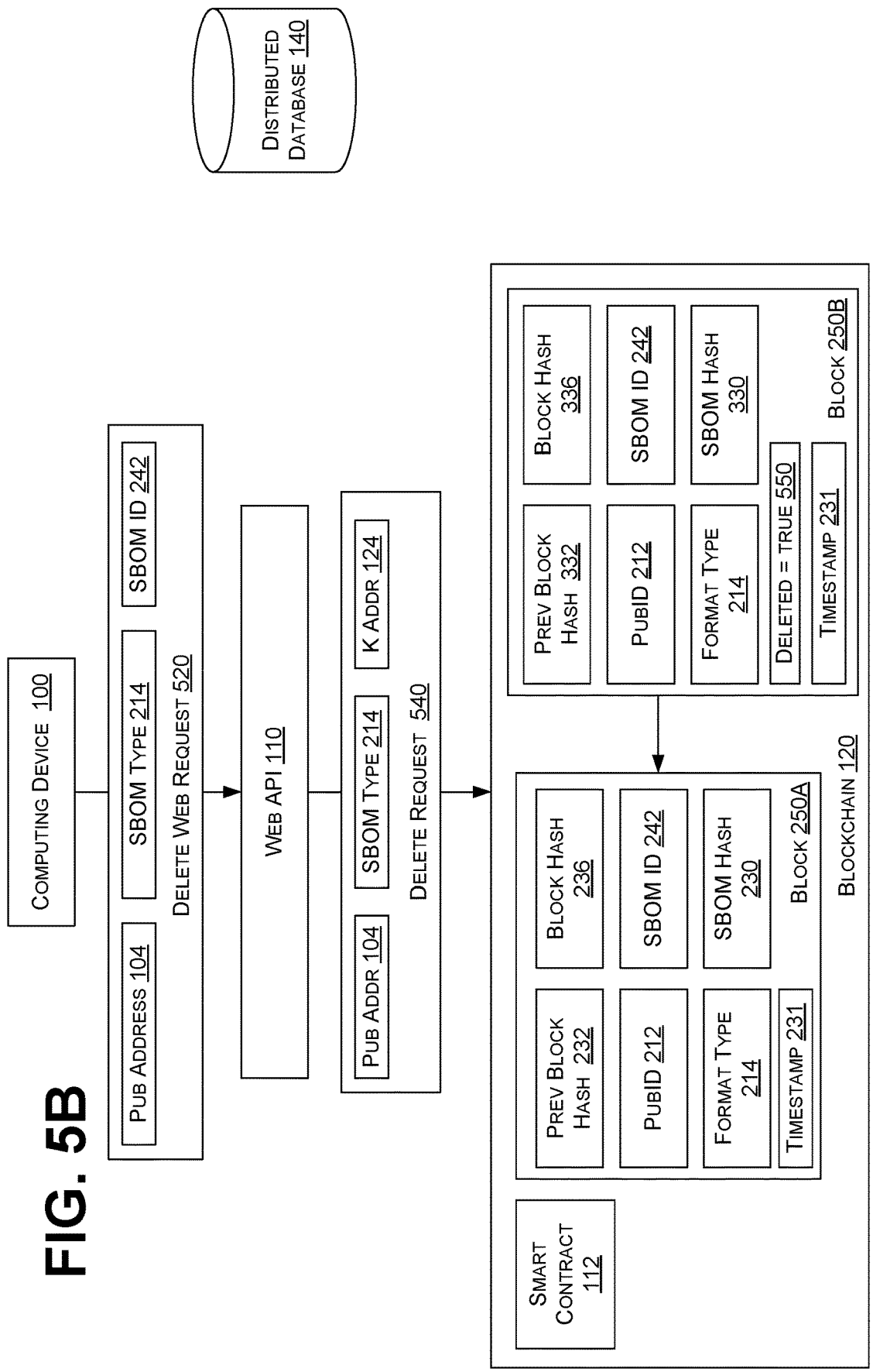

FIG. 5B illustrates Web API 110 responding to delete web request 520 by generating delete request 540 and submitting it to blockchain 120. Web API 110 includes publisher address 104, SBOM type 214, and contract address 124 in delete request 540. Delete request 540 is processed by the delete function 118 of smart contract 112 to logically remove any blocks associated with the provided publisher address 104, SBOM type 214, and contract address 124.

In some configurations, blocks are soft-deleted by setting a "deleted" flag 550 to true. When blockchain 120 is immutable, existing blocks cannot be removed, and so deletion may be performed by adding superseding blocks for each block being deleted, but with the "deleted" flag 550 set to true.

In some configurations, delete function 118 returns to Web API 110 the SBOM hashes from any block that was deleted. Web API 110 may then submit requests to distributed database 140 to delete the corresponding SBOM files. In some configurations delete function 118 is idempotent, in that once deleted a block 250 is always considered deleted. This constraint-deleted blocks remain deleted—may be enforced by smart contract 112.

Figure 6:
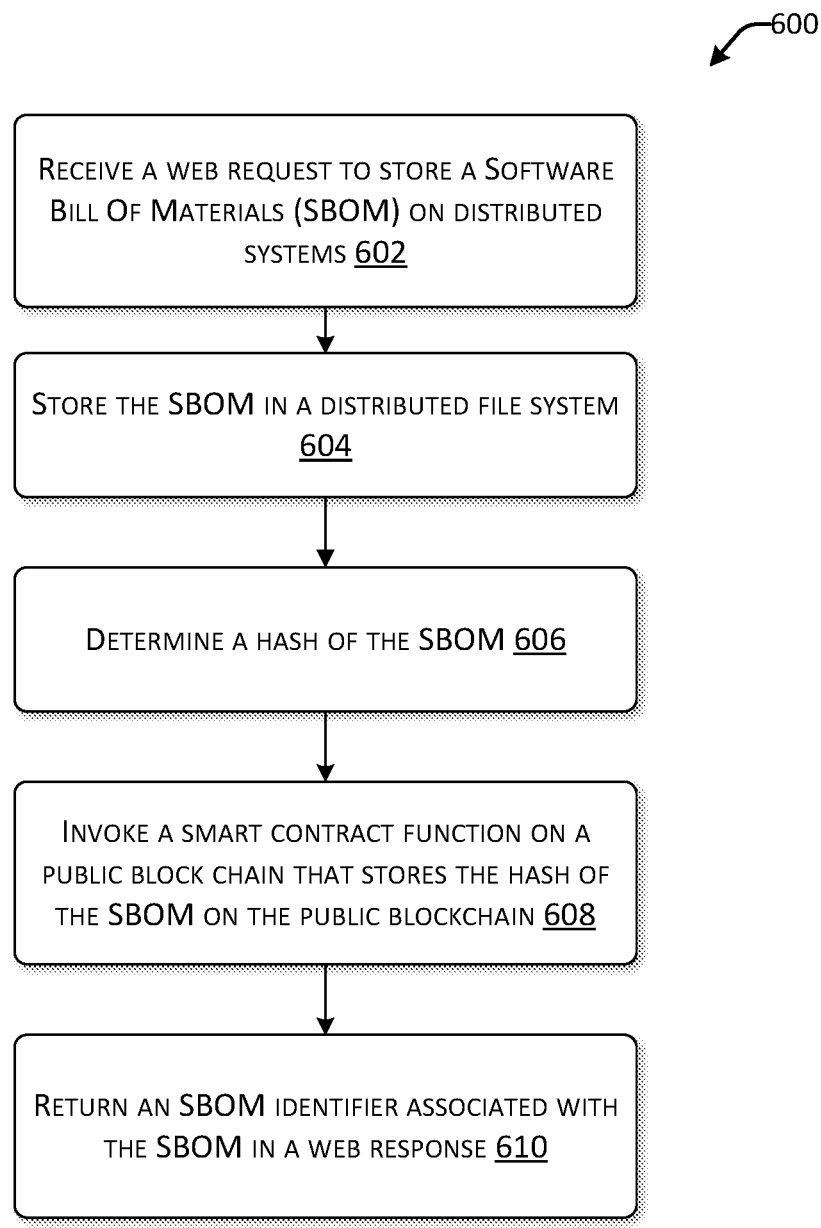
FIG. 6 is a flow diagram of an example method for storage and consumption of SBOM on distributed systems.

With reference to FIG. 6, routine 600 begins at operation 602, where a store web request 220 is received by Web API 110.

Next at operation 604, an SBOM 210 included in the store web request is stored in distributed file system 140.

Next at operation 606, a hash 230 of SBOM 210 is determined. For example, SBOM hash 230 is received from distributed file system 140.

Next at operation 608, a smart contract function store function 114 that is part of smart contract 112 is invoked. Store function 114 stores SBOM hash 230 in a block 250A on blockchain 120.

Next at operation 610, an SBOM identifier 242 associated with SBOM 210 is returned to computing device 100 as part of store web response 260.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 7:
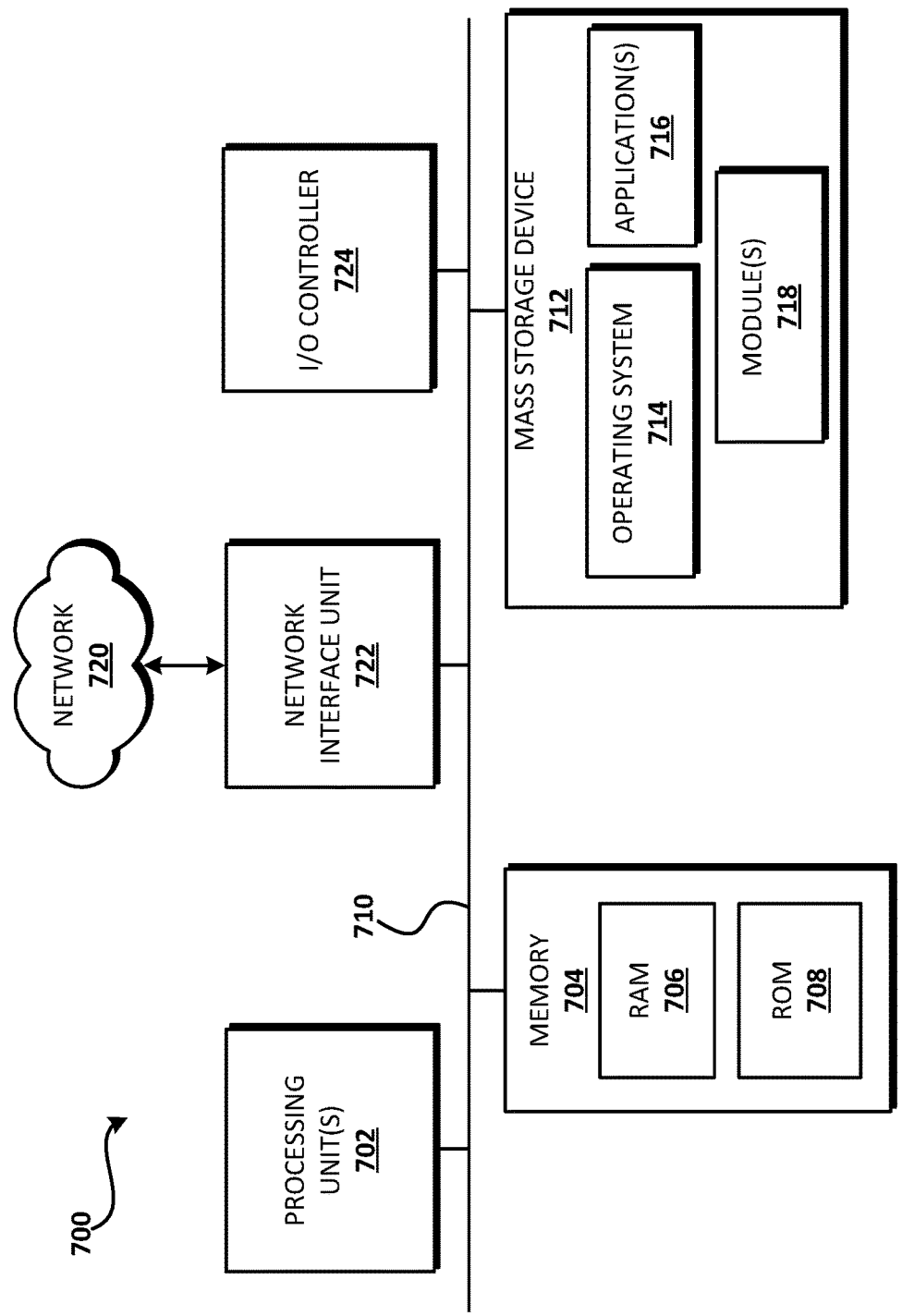
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the systems described herein, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
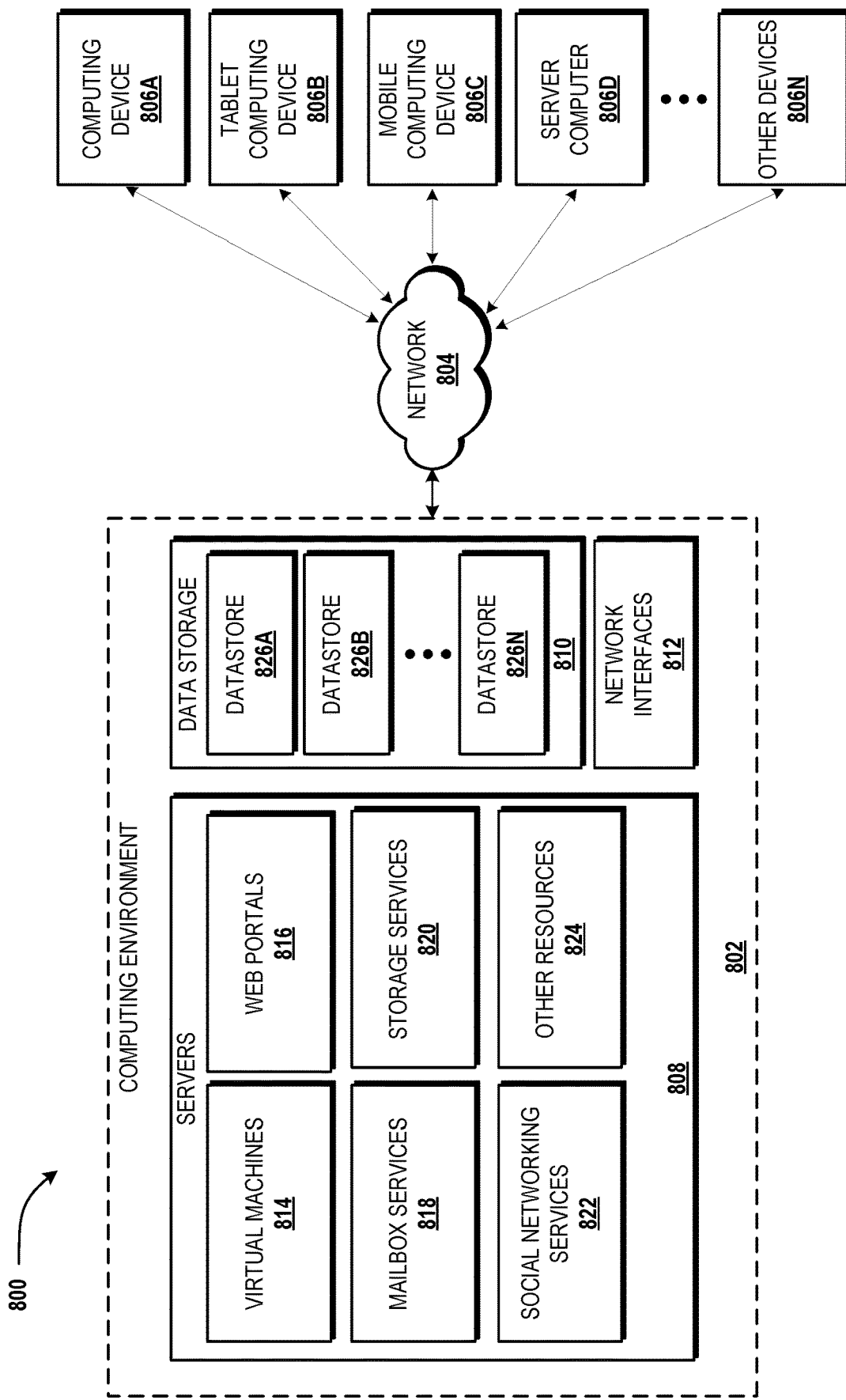
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein. Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The present disclosure is supplemented by the following example clauses:

Example 1: A method comprising: receiving a store web request including a Software Bill Of Materials (SBOM) and publisher identifier; storing the SBOM in a distributed database; determining an SBOM hash of the SBOM; generating an SBOM identifier; and invoking a store function of a smart contract on a blockchain, causing the store function to create a block on blockchain that includes the SBOM identifier, the SBOM hash, and the publisher identifier.

Example 2: The method of example 1, wherein the store web request includes an SBOM format type that indicates a format of the SBOM.

Example 3: The method of example 1, the SBOM identifier is associated with a plurality of SBOMs that are associated with different versions of a component.

Example 4: The method of example 1, further comprising: providing a store web response in response to the store web request, wherein the store web response includes the SBOM identifier.

Example 5: The method of example 1, wherein the store web request is received from a computing device performing a build of a component, and wherein the SBOM describes dependencies of the component.

Example 6: The method of example 1, further comprising: receiving an update web request that includes the SBOM identifier and an updated SBOM; storing the updated SBOM in the distributed database; determining a hash of the updated SBOM; and invoking the store function of the smart contract to store the updated SBOM on the blockchain.

Example 7: The method of example 1, further comprising: receiving a retrieve web request that includes the SBOM identifier; mapping the SBOM identifier to a contract address; invoking a retrieve function of the smart contract with the publisher address, the contract address, and the SBOM type.

Example 8: A computer-readable storage medium having computer-executable instructions stored thereupon that, when executed by a processor, cause the processor to: receive a store web request including a Software Bill Of Materials (SBOM) and publisher identifier; store the SBOM in a distributed database; receive an SBOM hash of the SBOM generated by the distributed database; generate an SBOM identifier; and invoke a store function of a smart contract on a blockchain, causing the store function to create a block on blockchain that includes the SBOM identifier, the SBOM hash, and the publisher identifier.

Example 9: The computer-readable storage medium of example 8, wherein the store function takes a contract address as a parameter, and wherein the contract address identifies the smart contract on the blockchain.

Example 10: The computer-readable storage medium of example 8, wherein the block stores a timestamp indicating when the store function was invoked.

Example 11: The computer-readable storage medium of example 8, wherein the computer-executable instructions further cause the processing-system to: receive a delete web request that includes the publisher address, the SBOM type, and the SBOM identifier; and invoking a delete function of the smart contract, causing the delete function to mark a block associated with the SBOM identifier as deleted.

Example 12: The computer-readable storage medium of example 11, wherein the computer-executable instructions further cause the processing-system to: delete from the distributed database SBOMs associated with the SBOM identifier.

Example 13: A processing system, comprising: a processor; and a computer-readable storage medium having computer-executable instructions stored thereupon that, when executed by the processing system, cause the processing system to: receive a store web request including a Software Bill Of Materials (SBOM), a SBOM type, and publisher identifier;

store the SBOM in a distributed database; receive an SBOM hash of the SBOM generated by the distributed database; generate an SBOM identifier; and invoke a store function of a smart contract on a blockchain, causing the store function to create a block on blockchain that includes the SBOM identifier, the SBOM type, the SBOM hash, and the publisher identifier.

Example 14: The processing system of example 13, wherein the computer-executable instructions further cause the processing system to: receive a request to register the smart contract.

Example 15: The processing system of example 14, wherein the computer-executable instructions further cause the processing system to: provide a contract address in response to the request to register the smart contract, wherein the contract address uniquely identifies the smart contract on the blockchain.

Example 16: The processing system of example 15, wherein the store function is identified based on the contract address.

Example 17: The processing system of example 13, wherein the store web request is received as an HTTP POST request.

Example 18: The processing system of example 13, wherein the SBOM defines dependencies of a software component.

Example 19: The processing system of example 18, wherein the computer-executable instructions further cause the processing system to: receive an update web request, wherein the update web request was sent by a computing device in response to generating another version of the software component, and wherein the update web request includes an SBOM of the other version of the software component.

Example 20: The processing system of example 19, wherein the computer-executable instructions further cause the processing system to: invoke an update function on the blockchain with a hash of the SBOM of the other version of the software component, causing the update function to add another block to the blockchain that supersedes the block.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
obtaining a store web request that comprises a Software Bill Of Materials (SBOM) associated with a software component and a publisher identifier;
storing the SBOM in a distributed database;
determining an SBOM hash of the SBOM;
generating an SBOM identifier, wherein the SBOM identifier is randomly generated, and wherein the SBOM identifier is associated with a plurality of SBOMs that are associated with different versions of the software component;
invoking a store function of a smart contract on a blockchain, causing the store function to create a block on the blockchain that comprises the SBOM identifier, the SBOM hash, and the publisher identifier; and
returning the SBOM identifier in response to the store web request.

2. The method of claim 1, wherein the store web request includes an SBOM format type that indicates a format of the SBOM.

3. The method of claim 1, wherein the SBOM is for a first version of a software component, further comprising:
obtaining a second store web request that comprises a second SBOM for a second version of the software component and the SBOM identifier;
determining a second SBOM hash of the second SBOM; and
invoking the store function of the smart contract on the blockchain, causing the store function to create a second block on the blockchain that comprises the SBOM identifier, the second SBOM hash, and the publisher identifier, and wherein the second block on the blockchain refers to the block on the blockchain.

4. The method of claim 1, wherein the store web request is received from a computing device performing a build of a component, and wherein the SBOM describes dependencies of the component.

5. The method of claim 1, further comprising:
receiving an update web request that includes the SBOM identifier and an updated SBOM;
storing the updated SBOM in the distributed database;
determining a hash of the updated SBOM; and
invoking the store function of the smart contract to store the updated SBOM on the blockchain.

6. The method of claim 1, further comprising:
receiving a retrieve web request that includes the SBOM identifier;
mapping the SBOM identifier to a contract address;
invoking a retrieve function of the smart contract with a publisher address, the contract address, and a SBOM type.

7. A computer-readable storage medium having computer-executable instructions stored thereupon that, when executed by a processor, cause the processor to:
obtain a store web request including a first Software Bill Of Materials (SBOM) associated with a first version of a software component and a publisher identifier;
store the first SBOM in a distributed database;
obtain a first SBOM hash of the first SBOM generated by the distributed database;

generate an SBOM identifier, wherein the SBOM identifier is associated with a plurality of SBOMs that are associated with different versions of the software component;

invoke a store function of a smart contract on a blockchain, causing the store function to create a block on the blockchain that comprises the SBOM identifier, the first SBOM hash, and the publisher identifier;

return the SBOM identifier in response to the store web request;

obtain a second store web request that comprises a second SBOM, the SBOM identifier, and the publisher identifier, wherein the second SBOM is associated with a second version of the software component; and invoke the store function of the smart contract, causing the store function to create another block on the blockchain that comprises the SBOM identifier, the publisher identifier, and a second SBOM hash of the second SBOM.

8. The computer-readable storage medium of claim 7, wherein the store function takes a contract address as a parameter, and wherein the contract address identifies the smart contract on the blockchain.

9. The computer-readable storage medium of claim 7, wherein the block stores a timestamp indicating when the store function was invoked.

10. The computer-readable storage medium of claim 7, wherein the computer-executable instructions further cause the processing-system to:

receive a delete web request that includes a publisher address, a SBOM type, and the SBOM identifier; and invoke a delete function of the smart contract, causing the delete function to mark a block associated with the SBOM identifier as deleted.

11. The computer-readable storage medium of claim 10, wherein the computer-executable instructions further cause the processing-system to:

delete from the distributed database SBOMs associated with the SBOM identifier.

12. A processing system, comprising:

a processor; and a computer-readable storage medium having computer-executable instructions stored thereupon that, when executed by the processing system, cause the processing system to:

receive a store web request including a first Software Bill Of Materials (SBOM) associated with a first version of a software component, an SBOM type, an SBOM format, and a publisher identifier;

store the first SBOM in a distributed database;

obtain a first SBOM hash of the first SBOM generated by the distributed database;

generate a random SBOM identifier, wherein the random SBOM identifier is associated with a plurality of SBOMs that are associated with different versions of the software component;

invoke a store function of a smart contract on a blockchain, wherein the store function takes a contract address as a parameter, and wherein the contract address identifies the smart contract on the blockchain, causing the store function to create a block on the blockchain that includes the SBOM identifier, the SBOM type, the first SBOM hash, a timestamp indicating when the store function was invoked, and the publisher identifier return the SBOM identifier in response to the store web request;

obtain a second store web request that comprises a second SBOM, the SBOM identifier, and the publisher identifier, wherein the second SBOM is associated with a second version of the software component; and invoke the store function of the smart contract, causing the store function to create another block on the blockchain that comprises the SBOM identifier, the publisher identifier, and a second SBOM hash of the second SBOM.

13. The processing system of claim 12, wherein the computer-executable instructions further cause the processing system to:

receive a request to register the smart contract.

14. The processing system of claim 13, wherein the computer-executable instructions further cause the processing system to:

provide the contract address in response to the request to register the smart contract, wherein the contract address uniquely identifies the smart contract on the blockchain.

15. The processing system of claim 14, wherein the store function is identified based on the contract address.

16. The processing system of claim 12, wherein the store web request is received as an HTTP POST request.

17. The processing system of claim 12, wherein the SBOM defines dependencies of the software component.

18. The processing system of claim 17, wherein the computer-executable instructions further cause the processing system to:

receive an update web request, wherein the update web request was sent by a computing device in response to generating another version of the software component, and wherein the update web request includes an SBOM of the other version of the software component.

19. The processing system of claim 18, wherein the computer-executable instructions further cause the processing system to:

invoke an update function on the blockchain with a hash of the SBOM of the other version of the software component, causing the update function to add another block to the blockchain that supersedes the block.

* * * * *